United States Patent
Hershey et al.

(10) Patent No.: US 10,404,569 B2
(45) Date of Patent: Sep. 3, 2019

(54) INTERNET OF THINGS ASSOCIATE

(71) Applicant: General Electric Company, Schenectady, NY (US)

(72) Inventors: John Erik Hershey, Ballston Lake, NY (US); Matthew Christian Nielsen, Scotia, NY (US); Christopher Donald Johnson, Niskayuna, NY (US); Michael Joseph Dell'Anno, Clifton Park, NY (US); Joji Joykutty, Karnatata (IN)

(73) Assignee: General Electric Company, Schenectady, NY (US)

( * ) Notice: Subject to any disclaimer, the term of this patent is extended or adjusted under 35 U.S.C. 154(b) by 248 days.

(21) Appl. No.: 15/243,417

(22) Filed: Aug. 22, 2016

(65) Prior Publication Data

US 2018/0054376 A1    Feb. 22, 2018

(51) Int. Cl.
*H04L 12/26* (2006.01)
*H04L 29/08* (2006.01)
(Continued)

(52) U.S. Cl.
CPC .......... *H04L 43/12* (2013.01); *G05B 23/0254* (2013.01); *H04L 12/66* (2013.01);
(Continued)

(58) Field of Classification Search
CPC ....... H04L 43/12; H04L 12/66; H04L 43/067; H04L 67/1002; H04L 67/12; H04W 4/70; G05B 23/0254; G05B 2219/25198
See application file for complete search history.

(56) References Cited

U.S. PATENT DOCUMENTS 8,180,368 B2   5/2012   Anderson et al.
8,984,113 B2   3/2015   Li et al.
(Continued)

FOREIGN PATENT DOCUMENTS

WO    2014/175721 A1    10/2014

OTHER PUBLICATIONS

"AGT International Announces IoTA, the First Analytics Platform for the Internet of Things, To Accelerate Development of the IOT", AGT International, https://www.agtinternational.com/press/agt-international-announces-iota-the-first-analytics-platform-for-the-internet-of-things-to-accelerate-development-of-the-iot/ , Oct. 15, 2014 (4pgs).

(Continued)

*Primary Examiner* — Jerry B Dennison
(74) *Attorney, Agent, or Firm* — Buckley, Maschoff & Talwalkar, LLC

(57) ABSTRACT

Some embodiments are directed to an Internet of Things ("IoT") associate to facilitate implementation of a digital twin of a twinned physical system. The IoT associate may include a communication port to communicate with at least one component, the at least one component comprising a sensor or an actuator associated with the twinned physical system, and a gateway to exchange information via the IoT. A computer processor and local data storage, coupled to the communication port and gateway, may receive a digital twin model from a data warehouse via the IoT. The computer processor may be programmed to, for at least a selected portion of the twinned physical system, execute the digital twin model in connection with the at least one component and operation of the twinned physical system.

20 Claims, 19 Drawing Sheets

(51) Int. Cl.
  *H04L 12/66* (2006.01)
  *H04W 4/70* (2018.01)
  *G05B 23/02* (2006.01)

(52) U.S. Cl.
  CPC ........ *H04L 43/067* (2013.01); *H04L 67/1002* (2013.01); *H04L 67/12* (2013.01); *H04W 4/70* (2018.02); *G05B 2219/25198* (2013.01)

(56) References Cited

U.S. PATENT DOCUMENTS

| | | | | |
|---|---|---|---|---|
| 9,772,623 | B2* | 9/2017 | Nixon | H04L 9/0869 |
| 2010/0293200 | A1* | 11/2010 | Assarpour | H04L 45/00 707/802 |
| 2011/0082596 | A1* | 4/2011 | Meagher | H02J 13/001 700/291 |
| 2013/0117434 | A1* | 5/2013 | Chakrabarti | H04L 45/70 709/224 |
| 2014/0196462 | A1* | 7/2014 | Nguyen | G05B 23/0283 60/772 |
| 2014/0244833 | A1 | 8/2014 | Sharma et al. | |
| 2015/0006695 | A1 | 1/2015 | Gupta | |
| 2015/0019710 | A1 | 1/2015 | Shaashua et al. | |
| 2015/0023179 | A1* | 1/2015 | Stein | H04L 43/0811 370/241.1 |
| 2015/0274315 | A1* | 10/2015 | Conrad | B64D 45/00 701/31.9 |
| 2016/0026490 | A1* | 1/2016 | Johnsson | H04L 43/0864 718/1 |
| 2016/0105305 | A1* | 4/2016 | Pignataro | H04L 67/32 709/223 |
| 2016/0291826 | A1* | 10/2016 | Verzano | H04L 41/145 |
| 2016/0337720 | A1* | 11/2016 | Krishnamurthy | G08B 25/14 |
| 2016/0344552 | A1* | 11/2016 | Sharma | H04L 9/3242 |
| 2017/0019870 | A1* | 1/2017 | Srivastava | H04W 56/001 |
| 2017/0063810 | A1* | 3/2017 | Bruce | H04L 63/045 |
| 2017/0064491 | A1* | 3/2017 | Mirza | H04W 4/70 |
| 2017/0187533 | A1* | 6/2017 | Raj | H04L 9/3234 |
| 2017/0203854 | A1* | 7/2017 | Lewis | B64C 27/12 |
| 2017/0269561 | A1* | 9/2017 | Wood | G05B 13/041 |
| 2017/0272342 | A1* | 9/2017 | Zessin | H04L 41/145 |
| 2017/0286572 | A1* | 10/2017 | Hershey | G06F 17/18 |
| 2017/0372212 | A1* | 12/2017 | Zasadzinski | G06N 99/005 |
| 2018/0005151 | A1* | 1/2018 | Liao | G06Q 40/06 |
| 2018/0039249 | A1* | 2/2018 | Johnson | G05B 19/401 |
| 2018/0041409 | A1* | 2/2018 | Vasseur | H04L 63/00 |

OTHER PUBLICATIONS

"Lai, Eric, BlackBerry Unveils IoT Platform, Device Prices on AT&T, Momentum for BBM and New Smart watch App (Pictures)", CES 2015, http://blogs.blackberry.com/2015/01/ces-2015-blackberry-launches-iot/, Jan. 1, 2015 (5pgs).

Reddy, Tirumaleswar et al. Security for IOT Devices, Cisco Systems Inc, https://priorart.ip.com/IPCOM/000246103, May 6, 2016, (6pgs).

"Overview of Internet of Things", Google Cloud Platform, https://cloud.google.com/solutions/iot-overview, download date Jun. 21, 2016, (19pgs).

Chen, T. and Chiu, M-C., "Development of a cloud-based factory simulation system for enabling ubiquitous factory simulation," vol. 45, pp. 133-143, (Jun. 2017).

Schroeder, G. et al., "Visualising the digital twin using web services and augmented reality," 14th International Conference on Industrial Informatics (INDIN), pp. 522-527, (2016).

International Search Report and Written Opinion issued in connection with corresponding PCT Application No. PCT/US17/45752 dated Oct. 18, 2017.

* cited by examiner

US 10,404,569 B2

INTERNET OF THINGS ASSOCIATE

BACKGROUND

It is often desirable to make assessment and/or predictions regarding the operation of a real world physical system, such as an electro-mechanical system. For example, it may be helpful to predict a Remaining Useful Life ("RUL") of an electro-mechanical system, such as an aircraft engine, to help plan when the system should be replaced. Likewise, an owner or operator of a system might want to monitor a condition of the system, or a portion of the system, to help make maintenance decisions, budget predictions, etc. Even with improvements in sensor and computer technologies, however, accurately making such assessments and/or predictions can be a difficult task. For example, an event that occurs while a system is not operating might impact the RUL and/or condition of the system but not be taken into account by typical approaches to system assessment and/or prediction processes.

Note that a real world physical system might be associated with system components, such as sensors and actuators. Increasingly, systems are becoming spatially distributed and these systems therefore include components that are significantly spatially distributed. As a consequence, there may be a need to provide an information transportation fabric that serves to sense, transport data, and control the spatially distributed components in order for the system to function efficiently and safely. The Internet of Things ("IoT") may provide a new dimension of connectivity, but there may still be a need for a module that provides connectivity and computational intelligence for system components that are connected to the IoT.

It would therefore be desirable to provide systems and methods to facilitate assessments and/or predictions for a physical system associated with the IoT in an automatic and accurate manner.

SUMMARY

Some embodiments are directed to an Internet of Things ("IoT") associate to facilitate implementation of a digital twin of a twinned physical system. The IoT associate may include a communication port to communicate with at least one component, the at least one component comprising a sensor or an actuator associated with the twinned physical system, and a gateway to exchange information via the IoT. A computer processor and local data storage, coupled to the communication port and gateway, may receive a digital twin model from a data warehouse via the IoT. The computer processor may be programmed to, for at least a selected portion of the twinned physical system, execute the digital twin model in connection with the at least one component and operation of the twinned physical system.

Some embodiments comprise: means for sensing, by one or more sensors, one or more designated parameters of the twinned physical system; means for receiving, via the IoT, a digital twin model from a data warehouse; means for executing by a computer processor the digital twin model (for at least a selected portion of the twinned physical system) in connection with the one or more sensors and operation of the twinned physical system; and means for transmitting information associated with a result generated by the computer processor.

Some technical advantages of embodiments disclosed herein are improved systems and methods to facilitate assessments and/or predictions for a physical system in an automatic and accurate manner.

DETAILED DESCRIPTION

Figure 1A:
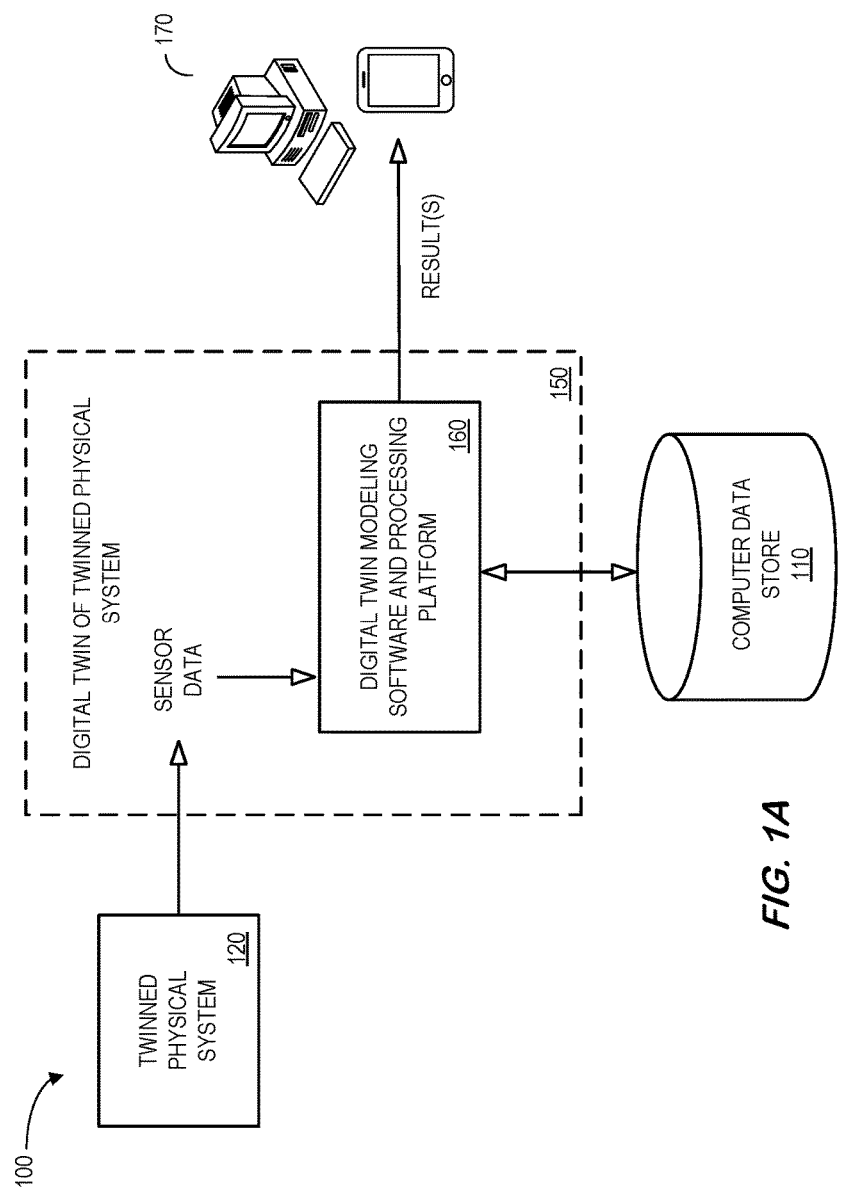
FIG. 1A is a high-level block diagram of a system that may be provided in accordance with some embodiments.

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

It is often desirable to make assessment and/or predictions regarding the operation of a real world physical system, such as an electro-mechanical system. For example, it may be helpful to predict the Remaining Useful Life ("RUL") of an electro-mechanical system, such as an aircraft engine, to help plan when the system should be replaced. In some cases, an expected useful life of a system may be estimated by a calculation process involving the probabilities of failure of the system's individual components, the individual components having their own reliability measures and distributions. Such an approach, however, might tend to more reactive than proactive.

With the advancement of sensors, communications, and computational modeling, it may be possible to consider multiple components of a system, each having its own micro-characteristics and not just average measures of a plurality of components associated with a production run or lot. Moreover, it may be possible to very accurately monitor and continually assess the health of individual components, predict their remaining lives, and consequently estimate the health and remaining useful lives of systems that employ them. This would be a significant advance for applied prognostics, and discovering a system and methodology to do so in an accurate and efficient manner will help reduce unplanned down time for complex systems (resulting in cost savings and increased operational efficiency). It may also be possible to achieve a more nearly optimal control of a twined physical system if the life of the parts can be accurately determined as well as any degradation of the key components. According to some embodiments described herein, this information may be provided by a "digital twin" of a twinned physical system.

A digital twin may estimate a remaining useful life of a twinned physical system using sensors, communications, modeling, history, and computation. It may provide an answer in a time frame that is useful, that is, meaningfully prior to a projected occurrence of a failure event or suboptimal operation. It might comprise a code object with parameters and dimensions of its physical twin's parameters and dimensions that provide measured values, and keeps the values of those parameters and dimensions current by receiving and updating values via outputs from sensors embedded in the physical twin. The digital twin may be, according to some embodiments, upgraded upon occurrence of unpredicted events and other data, such as the discovery and identification of exogenous variables, which may enhance accuracy. The digital twin may also be used to prequalify a twinned physical system's reliability for a planned mission. The digital twin may comprise a real time efficiency and life consumption state estimation device. It may comprise a specific, or "per asset," portfolio of system models and asset specific sensors. It may receive inspection and/or operational data and track a single specific asset over its lifetime with observed data and calculated state changes. Some digital twin models may include a functional or mathematical form that is the same for like asset systems, but will have tracked parameters and state variables that are specific to each individual asset system.

A twinned physical system may be either operating or non-operating. When non-operating, the digital twin may remain operational and its sensors may keep measuring their assigned parameters. In this way, a digital twin may still make accurate assessments and predictions even when the twinned physical system is altered or damaged in a non-operational state. Note that if the digital twin and its sensors were also non-operational, the digital twin might be unaware of significant events of interest.

A digital twin may be placed on a twinned physical system and run autonomously or globally with a connection to external resources using the Internet of Things (IoT) or other data services. Note that an instantiation of the digital twin's software could take place at multiple locations. A digital twin's software could reside near the asset and used to help control the operation of the asset. Another location might be at a plant or farm level, where system level digital twin models may be used to help determine optimal operating conditions for a desired outcome, such as minimum fuel usage to achieve a desired power output of a power plant. In addition, a digital twin's software could reside in the cloud, implemented on a server remote from the asset. The advantages of such a location might include scalable computing resources to solve computationally intensive calculations required to converge a digital twin model producing an output vector $\bar{y}$.

It should be noted that multiple but different digital twin models for a specific asset, such as a gas turbine, could reside at all three of these types of locations. Each location might, for example, be able to gather different data, which may allow for better observation of the asset states and hence determination of the tuning parameters, $\bar{a}$, especially when the different digital twin models exchange information.

A "Per Asset" digital twin may be associated with a software model for a particular twinned physical system. The mathematical form of the model underlying similar assets may, according to some embodiments, be altered from like asset system to like asset system to match the particular configuration or mode of incorporation of each asset system. A Per Asset digital twin may comprise a model of the structural components, their physical functions, and/or their interactions. A Per Asset digital twin might receive sensor data from sensors that report on the health and stability of a system, environmental conditions, and/or the system's response and state in response to commands issued to the system. A Per Asset digital twin may also track and perform calculations associated with estimating a system's remaining useful life.

A Per Asset digital twin may comprise a mathematical representation or model along with a set of tuned parameters that describe the current state of the asset. This is often done with a kernel-model framework, where a kernel represents the baseline physics of operation or phenomenon of interest pertaining to the asset. The kernel has a general form of:

$$\bar{y} = f(\bar{a}, \bar{x})$$

where $\bar{a}$ is a vector containing a set of tuning parameters that are specific to the asset and its current state. Examples may include component efficiencies in different sections of an aircraft engine or gas turbine. The vector $\bar{x}$ contains the kernel inputs, such as operating conditions (fuel flow, altitude, ambient temperature, pressure, etc.). Finally, the vector $\bar{y}$ is the kernel outputs which could include sensor measurement estimates or asset states (part life damage states, etc.).

When a kernel is tuned to a specific asset, the vector $\bar{a}$ is determined, and the result is called the Per Asset digital twin model. The vector $\bar{a}$ will be different for each asset and will change over its operational life. The Component Dimensional Value table ("CDV") may record the vector $\bar{a}$. It may be advantageous to keep all computed vector $\bar{a}$'s versus time to then perform trending analyses or anomaly detection.

A Per Asset digital twin may be configured to function as a continually tuned digital twin, a digital twin that is continually updated as its twinned physical system is on-operation, an economic operations digital twin used to create demonstrable business value, an adaptable digital twin that is designed to adapt to new scenarios and new system configurations and may be transferred to another system or class of systems, and/or one of a plurality of interacting digital twins that are scalable over an asset class and may be broadened to not only model a twinned physical system but also provide control over the asset.

FIG. 1A is a high-level architecture of a system 100 in accordance with some embodiments. The system 100 includes a computer data store 110 that provides information to a digital twin of twinned physical asset or system 150. Data in the data store 110 might include, for example, information about a twinned physical system 120, such as historic engine sensor information about a number of different aircraft engines and prior aircraft flights (e.g., external temperatures, exhaust gas temperatures, engine model numbers, takeoff and landing airports, etc.).

The digital twin of twinned physical system 150 may, according to some embodiments, access the data store 110 and utilize a probabilistic model creation unit to automatically create a predictive model that may be used by a digital twin modeling software and processing platform to create a prediction and/or result that may be transmitted to various user platforms 170 as appropriate (e.g., for display to a user). As used herein, the term "automatically" may refer to, for example, actions that can be performed with little or no human intervention.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The digital twin of twinned physical system 150 may store information into and/or retrieve information from various data sources, such as the computer data store 110 and/or user platforms 170. The various data sources may be locally stored or reside remote from the digital twin of twinned physical system 150. Although a single digital twin of twinned physical system 150 is shown in FIG. 1A, any number of such devices may be included. Moreover, various devices described herein might be combined according to embodiments of the present invention. For example, in some embodiments, the digital twin of twinned physical system 150 and one or more data sources might comprise a single apparatus. The digital twin software of twinned physical system 150 function may be performed by a constellation of networked apparatuses, in a distributed processing or cloud-based architecture.

Figure 1B:
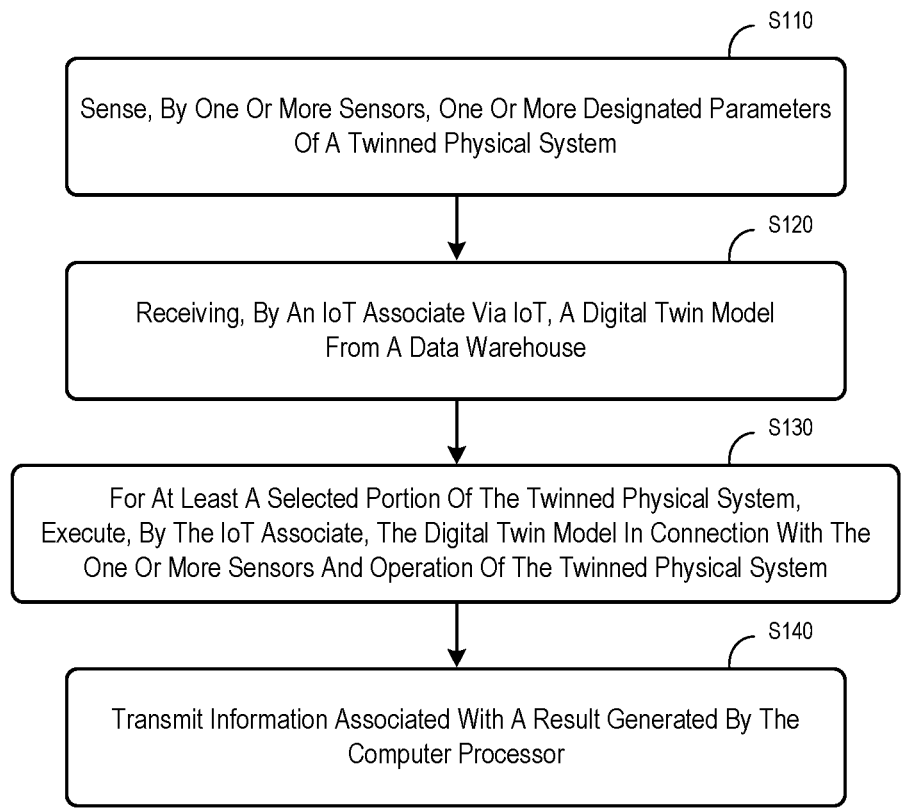
FIG. 1B is a digital twin method according to some embodiments.

A user may access the system 100 via one of the user platforms 170 (e.g., a personal computer, tablet, or smartphone) to view information about and/or manage a digital twin in accordance with any of the embodiments described herein. According to some embodiments, an interactive graphical display interface may let an operator define and/or adjust certain parameters and/or provide or receive automatically generated recommendations or results. For example, FIG. 1B illustrates a method that might be performed by some or all of the elements of the system 100 described with respect to FIG. 1A. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S110, one or more sensors may sense one or more designated parameters of the twinned physical system. According to some embodiments, these sensed parameters may be received by an Internet of Things ("IoT") associate to facilitate implementation of a digital twin of a twinned physical system. As used herein, the phrase "IoT" associate might refer to, for example, an apparatus having a communication port to communicate with at least one component, the at least one component comprising a sensor or an actuator associated with the twinned physical system. The apparatus may further have a gateway to exchange information via the IoT and a computer processor and local data storage, coupled to the communication port and gateway, to receive a digital twin model from a data warehouse via the IoT and programmed to, for at least a selected portion of the twinned physical system, execute the digital twin model in connection with the at least one component and operation of the twinned physical system.

At S120, the IoT associate may receive, via the IoT, a digital twin model from a data warehouse. At S130, for at least a selected portion of the twinned physical system, a computer processor of the IoT associate may execute the digital twin model in connection with the one or more sensors and operation of the twinned physical system. The IoT associate may then, at S140, transmit information associated with a result generated by the computer processor. The transmitted information might comprise, for example, a control signal to an actuator, a prediction, a report, etc.

Thus, one or more sensors may sense one or more designated parameters of a twinned physical system. According to some embodiments, for at least a selected portion of the twinned physical system, a computer processor may execute at least one of: (i) a monitoring process to monitor a condition of the selected portion of the twinned physical system based at least in part on the sensed values of the one or more designated parameters, and (ii) an assessing process to assess a remaining useful life of the selected portion of the twinned physical system based at least in part on the sensed values of the one or more designated parameters. Information associated with a result generated by the computer processor is transmitted via a communication port coupled to the computer processor. Note that, according to some embodiments, the one or more sensors are to sense values of the one or more designated parameters, and the computer processor is to execute at least one of the monitoring and assessing processes, even when the twinned physical system is not operating.

Figure 2A:
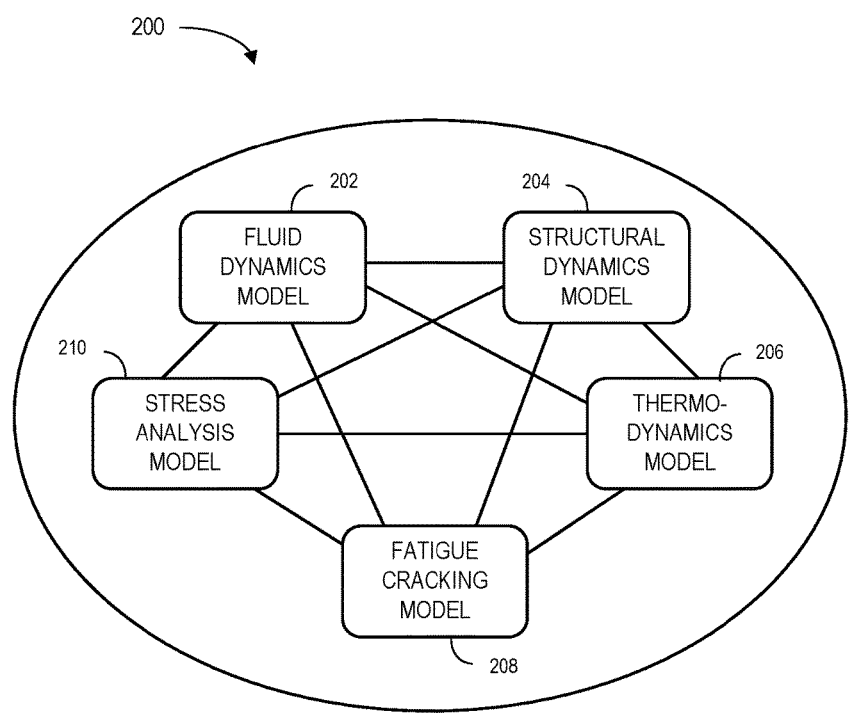
FIG. 2A illustrates integration of some physical computer models.

According to some embodiments described herein, a digital twin may have two functions: monitoring a twinned physical system and performing prognostics on it. Another function of a digital twin may comprise a limited or total control of the twinned physical system. In one embodiment, a digital twin of a twinned physical system consists of (1) one or more sensors sensing the values of designated parameters of the twinned physical system and (2) an ultra-realistic computer model of all of the subject system's multiple elements and their interactions under a spectrum of conditions. This may be implemented using a computer model having substantial number of degrees of freedom and may be associated with, as illustrated 200 in FIG. 2A, an integration of complex physical models for computational fluid dynamics 202, structural dynamics 204, thermodynamic modeling 206, stress analysis modeling 210, and/or a fatigue cracking model 208. Such an approach may be associated with, for example, a Unified Physics Model ("UPM"). Moreover, embodiments described herein may involve solving a resultant system of partial differential equations used in applied stochastic finite element methods, utilize a high performance computing resource, possibly on the scale of teraflops per second, and be implemented in usable manner.

Figure 2B:
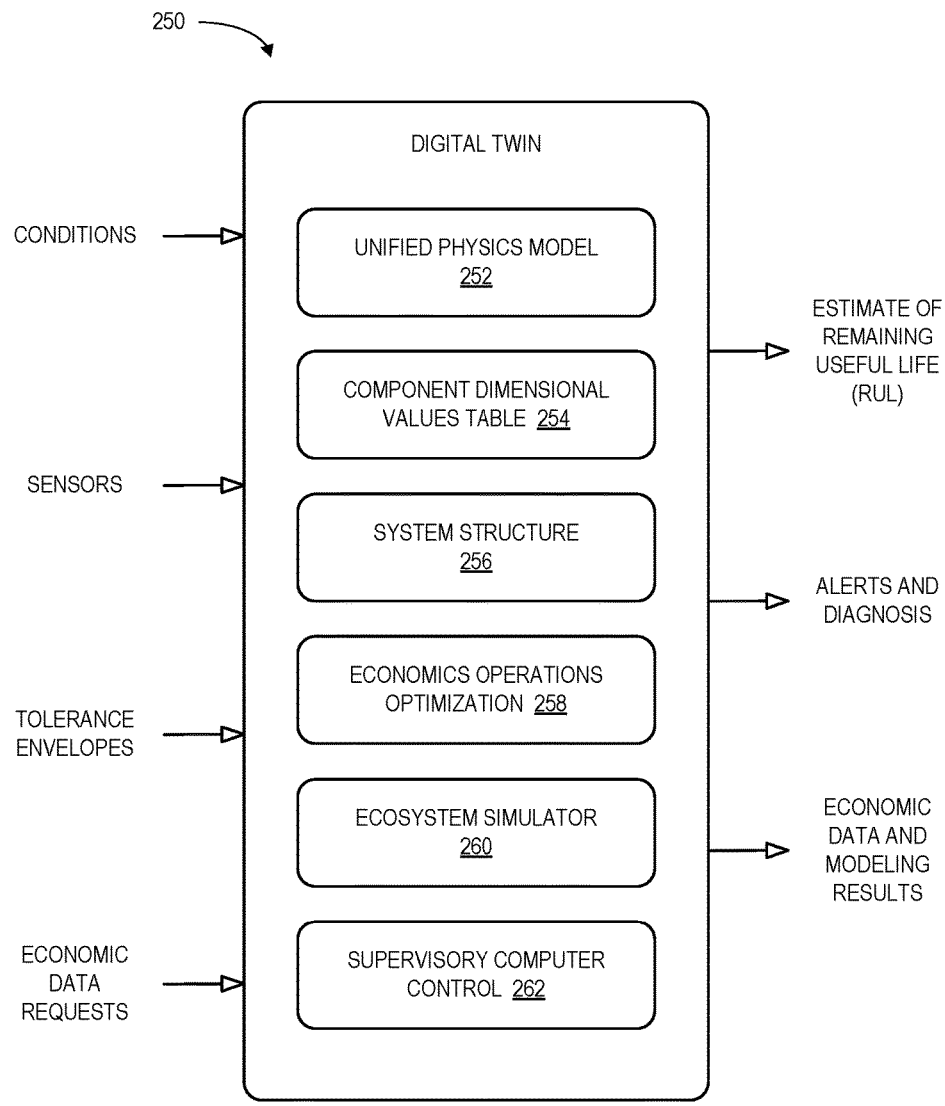
FIG. 2B illustrates six modules that may comprise a digital twin according to some embodiments.

Consider, for example, FIG. 2B which illustrates a digital twin 250 including such a UPM 252. The digital twin 250 may use algorithms, such as, but not limited to, an Extended Kalman Filter, to compare model predictions with measured data coming from a twinned physical system. The difference between predictions and the actual sensor data, called variances or innovations, may be used to tune internal model parameters such that the digital twin is 250 matched to the physical system. The digital twin's UPM 252 may be constructed such that it can adapt to varying environmental or operating conditions being seen by the actual twinned asset. The underlying physics-based equations may be adapted to reflect the new reality experienced by the physical system The digital twin 250 also includes a Component Dimensional Values ("CDV") table 254 which might comprise a list of all of the physical components of the twinned physical system. Each component may be labeled with a unique identifier, such as an Internet Protocol version 6 ("IPv6") address. Each component in the CDV table 254 may be associated with, or linked to, the values of its dimensions, the dimensions being the variables most important to the condition of the component. A Product Lifecycle Management ("PLM") infrastructure, if beneficially utilized, may be internally consistent with CDV table 254 so as to enable lifecycle asset performance states as calculated by the digital twin 250 to be a closed loop model validation enablement for dimensional and performance calculations and assumptions. The number of the components' dimensions and their values may be expanded to accommodate storage and updating of values of exogenous variables discovered during operations of the digital twin.

The digital twin 250 may also include a system structure 256 which specifies the components of the twinned physical system and how the components are connected or interact with each other. The system structure 256 may also specify how the components react to input conditions that include environmental data, operational controls, and/or externally applied forces.

The digital twin 250 might also include an economic operations optimization 258 that governs the use and consumption of an industrial system to create operational and/or key process outcomes that result in financial returns and risks to those planned returns over an interval of time for the industrial system user and service providers. Similarly, the digital twin 250 might include an ecosystem simulator 260 that may allow all contributors to interact, not just at the physical layer, but virtually as well. Component suppliers, or anyone with expertise, might supply the digital twin models that will operate in the ecosystem and interact in mutually beneficial ways. The digital twin 250 may further include a supervisory computer control 262 that controls the overall function of the digital twin 250 and accepts inputs and produces outputs. The flow of data, data store, calculations, and/or computing required to calculate state and then subsequently use that performance and life state estimation for operations and PLM closed loop design may be orchestrated by the supervisory computer control 262 such that a digital thread connects design, manufacturing, and/or operations.

As used herein, the term "on-operation" may refer to an operational state in which a twinned physical system and the digital twin 250 are both operating. The term "off-operation" may refer to an operational state in which the twinned physical system is not in operation but the digital twin 250 continues to operate. The phrase "black box" may refer to a subsystem that may be comprised by the digital twin 250 for recording and preserving information acquired on-operation of the twinned physical system to be available for analysis off-operation of the twinned physical system. The phrase "tolerance envelope" may refer to the residual, or magnitude, by which a sensor's reading may depart from its predicted value without initiating other action such as an alarm or diagnostic routine. The term "tuning" may refer to an adjustment of the digital twin's software or component values or other parameters. The operational state may be either off-operation or on-operation. The term "mode" may refer to an allowable operational protocol for the digital twin 250 and its twinned physical system. There may be, according to some embodiments, a primary mode associated with a main mission and secondary modes.

Referring again to FIG. 2B, the inputs to the digital twin 250 may include conditions that include environmental data, such as weather-related quantities, and operational controls such as requirements for the twinned physical system to achieve specific operations as would be the case for example for aircraft controls. Inputs may also include data from sensors that are placed on and within the twinned physical system. The sensor suite embedded within the twinned physical system may provide an information bridge to the digital twin software. Other inputs may include tolerance envelopes (that specify time and magnitude regions that are acceptable regions of differences between actual sensor values and their predictions by the digital twin), maintenance inspection data, manufacturing design data, and/or hypothetical exogenous data (e.g., weather, fuel cost and defined scenarios such as candidate design, data assignment, and maintenance/or workscopes).

The outputs from the digital twin 250 may include a continually updated estimate of the twinned physical system's Remaining Useful Life ("RUL"). The RUL estimate at time=t is for input conditions up through time=t–τ where τ is the digital twin's update interval. The outputs might further include a continually updated estimate of the twinned physical system's efficiency. The BTU/kWHr or Thrust/specific fuel consumption estimate at time=t is for input conditions up through time=t–τ where τ is the digital twin's update interval. Other outputs from the digital twin 250 may include alerts of possible twinned physical system component malfunctions and the results of the digital twin's diagnostic efforts and/or performance estimates of key components within the twinned physical system. For example, with the digital twin 250, an operator might be able to see how key sections of a gas turbine are degrading in performance. This might be an important consideration for maintenance scheduling, optimal control, and other goals. According to some embodiments, information may be recorded and preserved in a black box respecting on-operation information of the twinned physical system for analysis off-operation of the twinned physical system.

Figure 3:
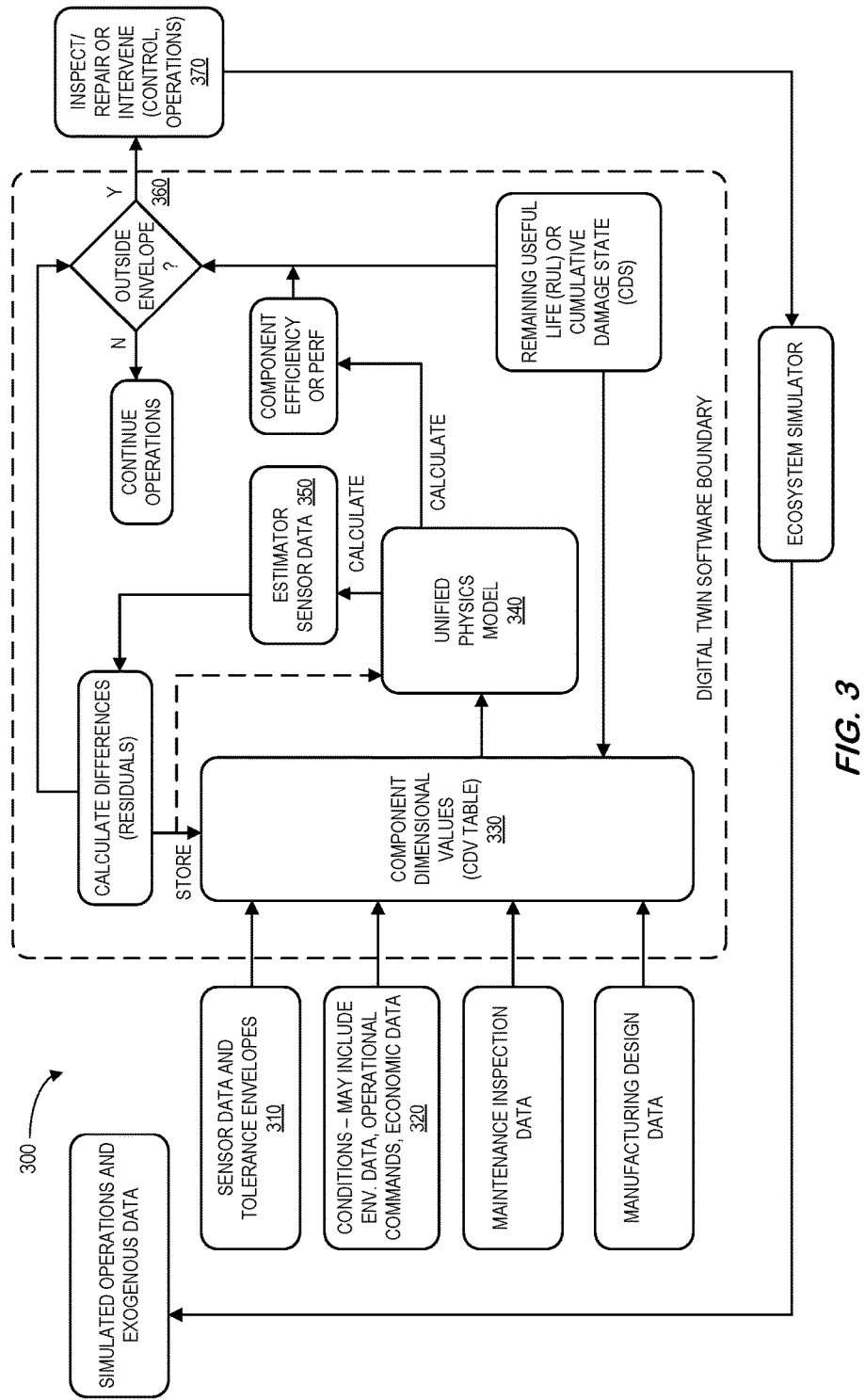
FIG. 3 illustrates an example of a digital twin's functions.

An example 300 of a digital twin's functions according to some embodiments is illustrated in FIG. 3. Sensor data and tolerance envelopes 310 from one or more sensors and conditions data 320, which includes operational commands, environmental data, economic data, etc., are continually entered into the digital twin software. A UPM 340 is driven by CDV values 330 (which may include maintenance inspection and/or manufacturing design data) and the conditions data 320. The sensor data 310 is compared to the expected sensor values 350 produced by the UPM 340. If differences between the sensor values at time=t and the UPM predictions fall outside of the tolerance envelopes, then a report issues at 360. The report 360 may state the occurrence of the exceedance and lists all of the components that have been previously identified and stored in the system structure of the digital twin. A report 360 recommendation 370 may indicate that the report 360 should be handled in different ways according to whether the digital twin is being examined off-line, at the conclusion of a mission for example, or whether the digital twin is operating on-line as it accompanies its twinned physical system and continually provides an estimate of the RUL (or a Cumulative Damage State ("CDS")). The CDV table 330 may be updated by the sensor 310 and conditions 320 data at time=t+τ. The recommendation 370 (e.g., to inspect, repair, and/or intervene in connection with control operations) may be used to determined simulated operations exogenous data via an ecosystem simulator.

Figure 4:
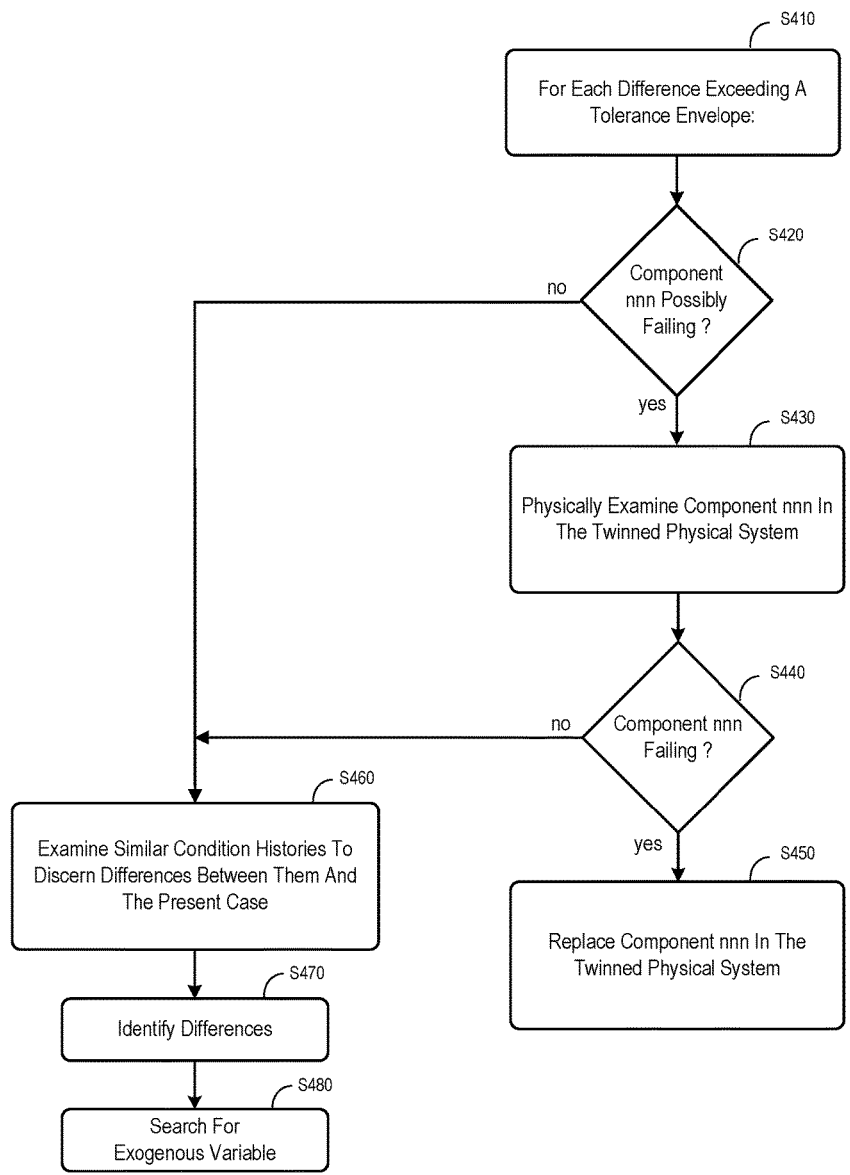
FIG. 4 illustrates off-line examination in accordance with some embodiments.

If a digital twin is examined off-line, the examination may progress as illustrated in FIG. 4. At S410, a start of an examination for each exceedance and candidate component may begin. Control passes to S420 where it is determined if the component nnn might have failed or be failing. Unless component nnn's potential failure is ruled out by other data, control passes to S430 wherein component nnn of the twinned physical system is physically examined. Control passes to S440 where the component's health has been determined upon physical inspection. If the component's health is inadequate, control passes to S450 where the component in the twinned physical system is replaced. If possible failure of component nnn has been ruled out in S420 (or the component was not failing at S440), control passes to S460 which orders an examination of previous and similar condition histories in an attempt to discern differences between previous similar condition histories and the present cases wherein an exceedance was reported. The differences are discerned in S470 and control passes to S480 which initiates a search for an exogenous variable, where, in this usage, an exogenous variable denotes an effect-causing factor not included in the system model.

Figure 5:
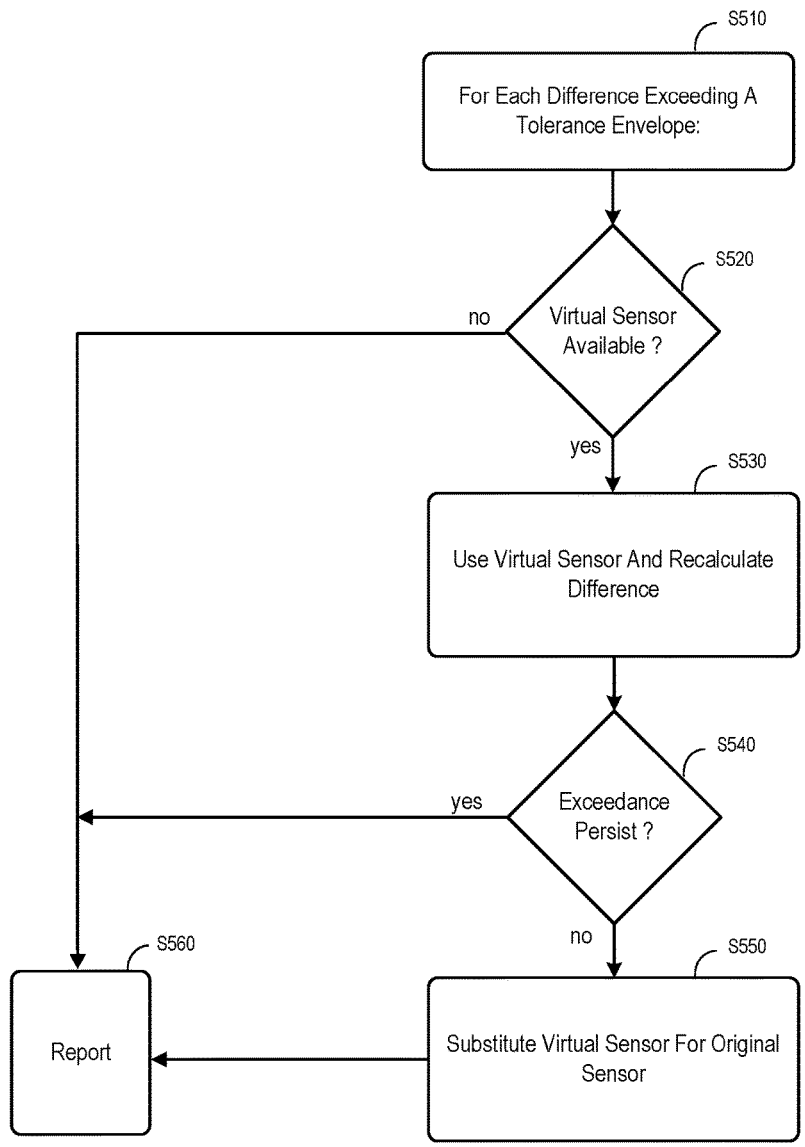
FIG. 5 illustrates one example of an on-line exceedance handling procedure.

If the digital twin is operating on-line as it accompanies its twinned physical system and an exceedance is reported, then the procedure according to FIG. 5 may be followed beginning with S510. The decision block S520 determines if a virtual sensor is known by the system structure of the digital twin for the sensor whose value has led to the reporting of an exceedance. According to some embodiments, a virtual sensor may sense un-measurable parameters when there is no sensor available, or when a suitable sensor is impractical, or the sensor in use has failed. If a virtual sensor is available, block S530 instructs that it be tested to see if the exceedance persists upon its use at block S540. If the exceedance does not persist, then block S550 instructs that the virtual sensor replace the original sensor and a report be made. If the virtual sensor does not resolve the reported differencing (of if no virtual sensor was available at block S520), then block S560 directs that a report be made so that appropriate action may be taken.

Note that sensor failure might be detected in a variety of other ways. For example, a simple technique for a digital twin to diagnose a rapid and pronounced failure of a sensor is to calculate the maximum rate that a particular sensor reading could possibly change given the mission profile. A sensor whose rate exceeded this maximum would be declared failed, or at the very least, highly suspect. For cases wherein a sensor does not undergo a sudden and dramatic failure, diagnosis may be made through the use of a bank of Kalman filters. A Kalman filter may take in sensor readings and produce state variable estimates that can be used with a built-in plant model to generate sensor estimates. Such a bank of filters may comprise a plurality of filters each of which uses a different sensor suite. The first filter may, for example, use all but the first sensor as an input, the second filter may use all but the second sensor as an input, etc. In this way, each filter can test the hypothesis that the sensor it does not include is not operating properly. That is, when a sensor fails the output of every filter except one will be corrupted by incorrect information (indicating which sensor has in fact failed).

The report at block S560 may also utilize a Kalman filter bank that is being applied to include actuator and component fault detection. This may be accomplished, for example, by adding an additional Kalman filter that utilizes all sensors, and estimates several tuning parameters in addition to the state variables to account for model mismatch due to component or actuator faults. If the tuning parameter estimates become large while the residuals in the sensor fault hypothesis filters remain small, it may indicate that the fault is within a component or actuator.

According to some embodiments, a comprehensive monitoring envelope may be employed by a digital twin. Note that monitoring of a twinned physical system's components may start with their manufacture and proceed through transportation of those components and eventually through an assembly of the components in building the twinned physical system. Monitoring of the completed twinned physical system may be continuous, according to some embodiments, even during the twinned physical system's downtime.

Figure 6:
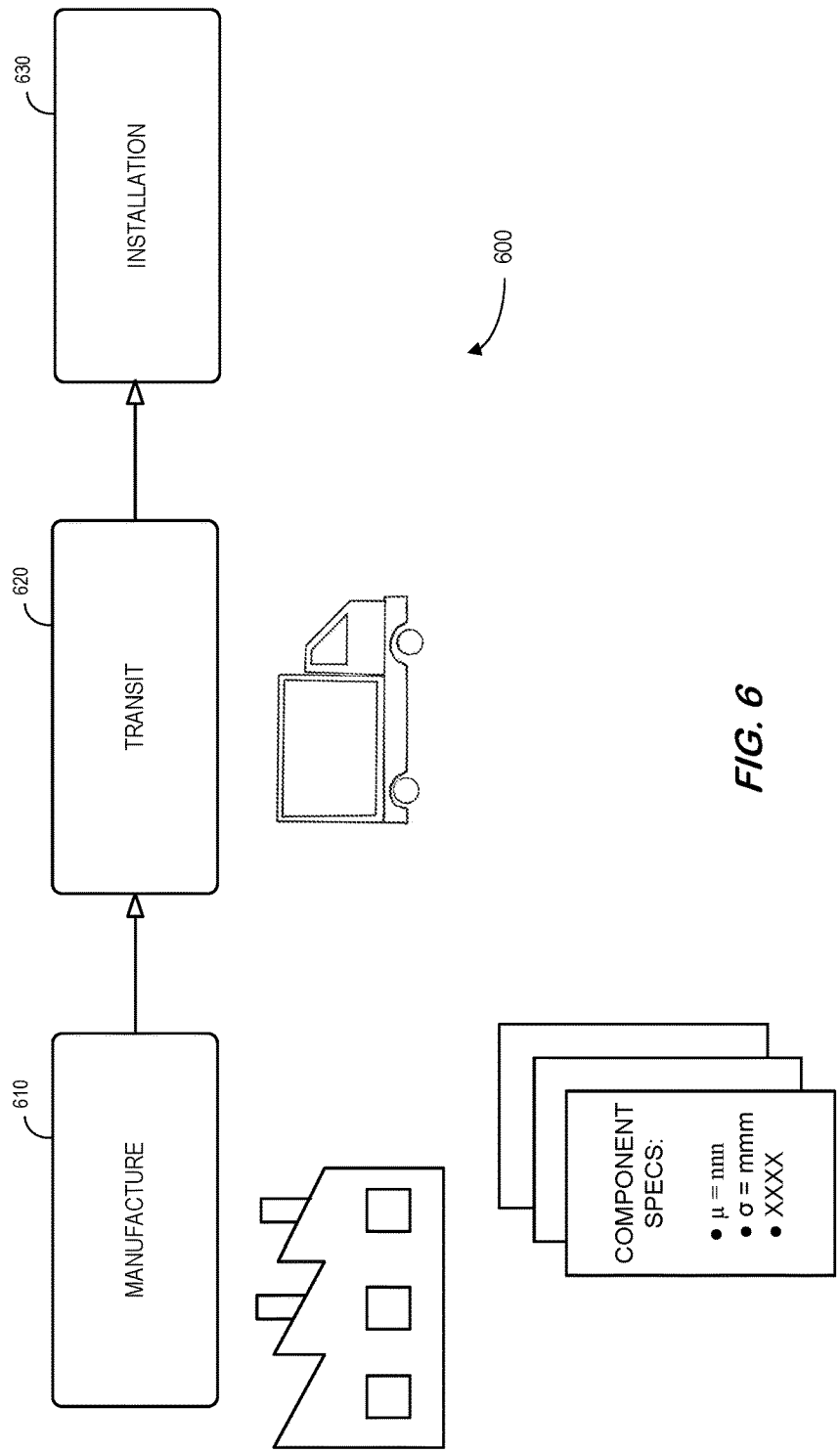
FIG. 6 illustrates one example of a comprehensive monitoring envelope.

According to some embodiments, significant RUL affecting events may be detected and evaluated. This may include inculcating a supply chain sensitivity during the building of the digitally twinned physical system. For example, FIG. 6 illustrates 600 a span of a comprehensive monitoring envelope that follows system components from manufacture 610 through transportation ("transit") 620 through installation 630. In manufacture 610, the system components may be produced using manufacturing techniques and practices that guarantee a narrow range on the plurality of system components produced in a manufacturing lot. The system components may then be transported to a user or owner for integration into a host system.

The transportation 620 of the system components can alter their RUL if conditions are encountered that exceed various limits such as, for example, temperature, shock, pressure, and/or humidity. The supply chain may require a system for collecting and analyzing shipment parameter data that affects the predicted statistical variables of the system components. Such a system may comprise a plurality of data collection subsystems for respectively collecting shipment parameter data encountered by respective articles being shipped, and a data analysis subsystem coupled to receive the collected shipment data for adjusting the respective predicted statistical variables of the articles. The data collected during the system component shipment may subsequently be entered into the digital twin.

Finally, the installation 630 of the system components may alter their expected RUL if the installation suffers misadventure such as, for example, rough handling, incorrect mounting, and/or excessive torque. One embodiment for guiding and monitoring the installation process (and collecting the information respecting any installation mishandling) is to provide an installer with a computer-instructed "wizard" with sensors attached to the installation tools and system components. The collected installation information may also be subsequently entered into the digital twin process.

In order to compute the RUL of a system, it may be necessary to know or assess the highly multi-dimensional state of the system. That the state of the system can change dramatically when the system is not in operation or not operating in its most stressful mode may at first seem counterintuitive. For example, an aircraft that is parked or taking on fuel, baggage, or passengers would not be expected to encounter as harsh an environment as during a flight portion.

Note that there may be cases where significant changes to, for example, an aircraft's health can occur during non-flight periods. For example, in at least one aircraft a pitch-up control cable was damaged when the controls were locked and the plane was parked when other aircraft taxied and blasted the parked plane. This caused a force between 0.2 and 2.8 times the limit load on the pitch-up cable. In this case, even a single exposure was thought to be enough to break the cable. Another example may be associated with low speed collisions of a parked aircraft with a ground service equipment vehicle (such as a baggage delivery vehicle or a fuel truck). Ground service equipment interactions are responsible for most of the damage to commercial transport aircraft and it is estimated that half of the damage is due to collisions with baggage vehicles. These collisions are blunt impacts and may affect a significant area (involve multiple elements hidden within the structure). Such collisions might leave no more than minimal visual signs of damage yet may still be deleterious to both aluminum and carbon-epoxy composite materials. Appropriate sensors might be deployed and monitor the system, in this example an aircraft, during periods of inactivity and incidents of potential damage may be noted and reported to the digital twin software.

Putting sensors, and even intelligence, into basic parts may expand the number of dimensions of any particular system so that no two systems will stay strictly identical as they age through different operational, control transient, and/or environmental conditions. The dimensions that significantly affect a particular component (and should therefore be tracked) during the component's life may be initially estimated by best engineering judgment and can be augmented or refined as more is learned about a particular component's behavior under different operational and/or environmental conditions. For example, an automobile has many components that are tracked by insurers in warranty programs. One of these components is the Interior Climate and Comfort ("ICC") system. This system includes a compressor, compressor mounting bracket, clutch and pulley, orifice tube, condenser, heater core, heater control valve, receiver/dryer, evaporator, air duct and outlets, accumulator, air conditioning temperature control program, and seals and gaskets. It may be intuitive that the ICC system will be sensitive to environmental temperature.

Figure 7:
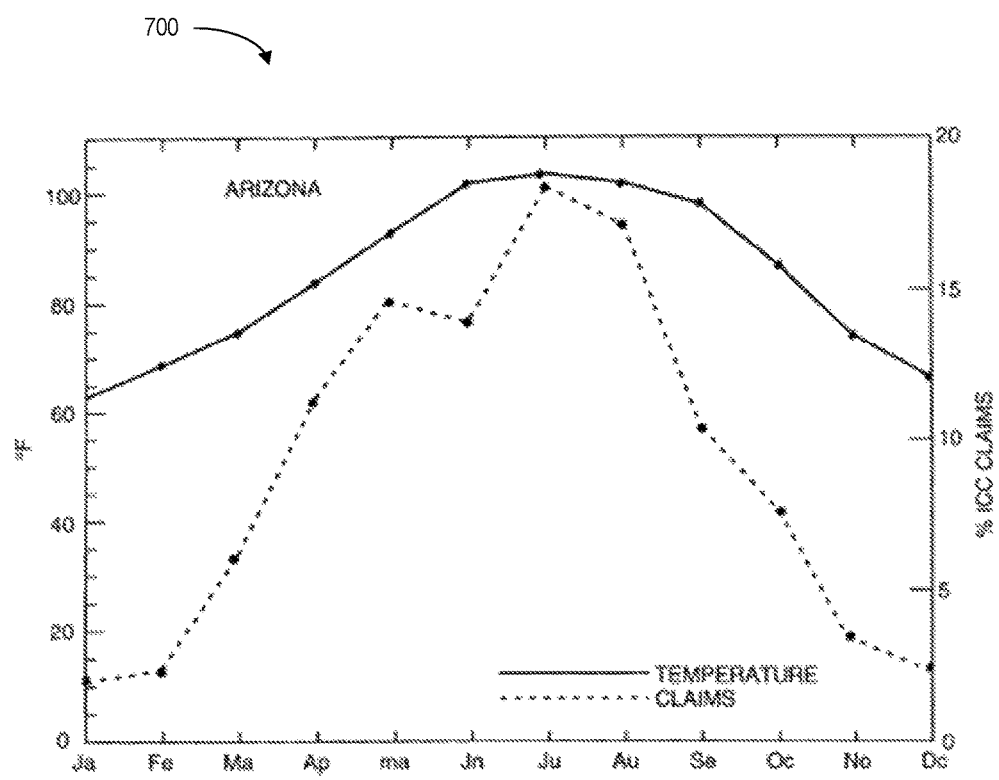
FIG. 7 illustrates temperatures and claim percentages according to some embodiments.

A study of the claims of a particular auto dealer warranty service upholds this intuition. FIG. 7 displays a plot 700 of both the normal monthly maximum daily temperature at a particular airport and the claim percentages of the cars under warranty versus month for that geographic area within the United States. The two variables have a linear correlation coefficient of equal to 0.939. If a digital twin were created for an ICC system, the dimensions of the stored operational and environmental data would include a history of the particular ICC system's temperature history.

There may be other, exogenous, variables that are not initially identified that meaningfully impact a component or system's health. Continuing with the example of the ICC system, considering all of the claims across the United States (using a major city in each state), a regression analysis may be performed using environmental data that includes the maximum of average monthly maximum temperature ($T_{max}$), the minimum of the average monthly minimum temperature ($T_{min}$), the yearly average Snow and Sleet ("S&S") accumulation in inches, the average Relative Humidity ("RH") percentage near mid-day, the normal Degree Days ("DD"), the yearly average total precipitation in inches ("Precip"), average number of days in year for which the minimum temperature is below freezing ("F"), and the elevation above sea level in feet ("E").

Figure 8:
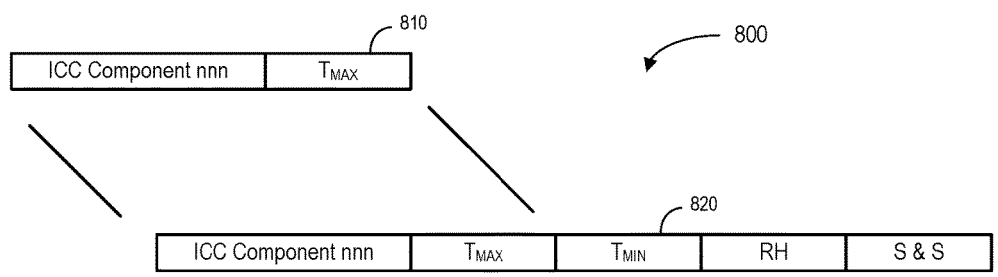
FIG. 8 illustrates dimensional expansion of ICC component dimensions.

Suitable techniques of multivariate linear regression may be applied and the dependent variables of interest can be fitted to a subset of the aforementioned eight environmental variables (i.e., $T_{max}$, $T_{min}$, S&S, RH, DD, Precip, F, and E). An equation may be derived by successive weighted least square refinements by excluding independent environmental variables with p-values that are no greater than 0.01. (The p-value in the regression analysis may represent the probability that the coefficient has no effect.) The resulting equation for the average number of claims for ICC per policy contract C, is:

$$C=-1.60+0.0135T_{max}+0.0116T_{min}+0.00432 RH+0.00369 S\&S$$

revealing important exogenous variables that aid the accuracy of the ICC component's health. FIG. 8 illustrates 800 the dimensional expansion of the component dimensions for the ICC components. Before the regression analysis disclosing that $T_{min}$, RH, and S&S were significant variables as well as $T_{max}$, the component dimensional values stored for the ICC components included only the single dimension for $T_{max}$ 810. After the regression analysis, the component dimensional values stored for the ICC components may be expanded to include the exogenous variables $T_{min}$, RH, and S&S 820.

Pictures, especially moving pictures, may instill greater insight for a technical observer as compared to what can be determined from presentations of arrays or a time series of numerical values. A structural engineer or a thermodynamics expert may often gain a deep insight into problems by observing the nature of component flexions or the development of heat gradients across components and their connections to other components.

For this reason, a Graphical Interface Engine ("GIE") may be included in a digital twin. The GIE may let an operator select components of the twinned physical system that are specified in the digital twin's system structure and display renderings of the selected components scaled to fit a monitor's display. The GIE may also animate the renderings as the digital twin simulates a mission and display the renderings with an overlaid color (or texture) map whose colors (or textures) correspond to ranges of selected variables comprising flexing displacement, stress, strain, temperature, etc.

The GIE may also be used in engineering design by allowing changes to be posited to values of components within the CDV table, such as material composition and dimensional values (e.g., a thickness value). Changes to linkage structures, joints and bearings, and/or variations of shape may also be posited to determine numerically and visually how the substitutions would function under a particular mission.

The GIE may, for example, be used to explore the question of sensor sufficiency. Generally, there may be fewer sensors incorporated in a twinned physical system than health parameters to be directly measured. Often, Kalman filters are used to estimate health parameters that are not directly measured by a dedicated sensor. But even though Kalman filtering seems to result in what appears to be good estimates from the outputs that are directly monitored, in the sense that the health parameter estimates can accurately recreate the directly monitored outputs, this might not guarantee an accurate estimation. The GIE may be used to devise and locate a potential additional sensor within the twinned physical system that will more directly measure a health parameter that other would otherwise be virtually and potentially inaccurately inferred by other sensors.

A digital twin may comprise a code object and its productive activity may be associated with computation. Effective computation may depend upon the computational structure provided, which may be central or dispersed, serial or parallel, and might be motivated at least in part by the communications structure that governs the delivery parameters of its sensor data to computing elements, the computer-to-computer channel time-bandwidth properties, and/or the interrupt protocols placed on disparate computing elements for parallel or concurrent computation.

Figure 9:
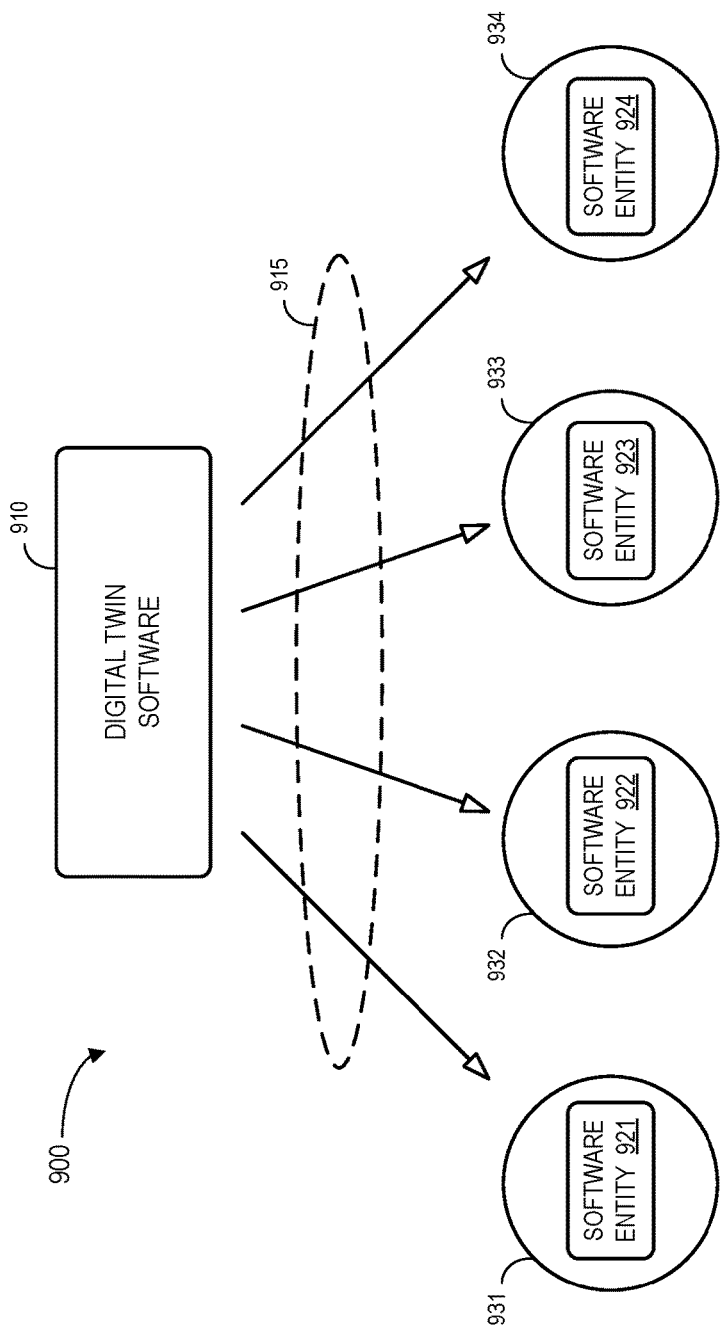
FIG. 9 illustrates partitioning of digital twin software code in accordance with some embodiments.

A digital twin may be run at a single location or may be distributed on or over a twinned physical system. One advantage of the latter instantiation may be an enhanced proximity of sensor computations to the sensors themselves. In one embodiment, a digital twin's codes and computations may be partitioned into a plurality of spatially separated units as illustrated by the system 900 in FIG. 9. The digital twin software 910 may be maintained in a data warehouse (not shown in FIG. 9). For this example, as indicated by 915, the digital twin software 910 may be partitioned into a set of software entities 921, 922, 923, 924. Each of these software entities 921, 922, 923, 924 may be hosted by an IoT associate. In this example, the software entities 921, 922, 923, 924 are respectively hosted by IoT associates 931, 932, 933, 934. The distribution of the software entities 921, 922, 923, 924 may be distributed to their respective IoT associate 931, 932, 933, 934 hosts using a Data Transportation Network ("DTN") that may be a private enterprise data network or a public network, such as the IoT. Each IoT associate 931, 932, 933, 934 may comprise a module with a structure for providing local data storage, performing computation, and/or serving as a gateway to the IoT for communications relating to the individual components of the modeled physical system.

Figure 10:
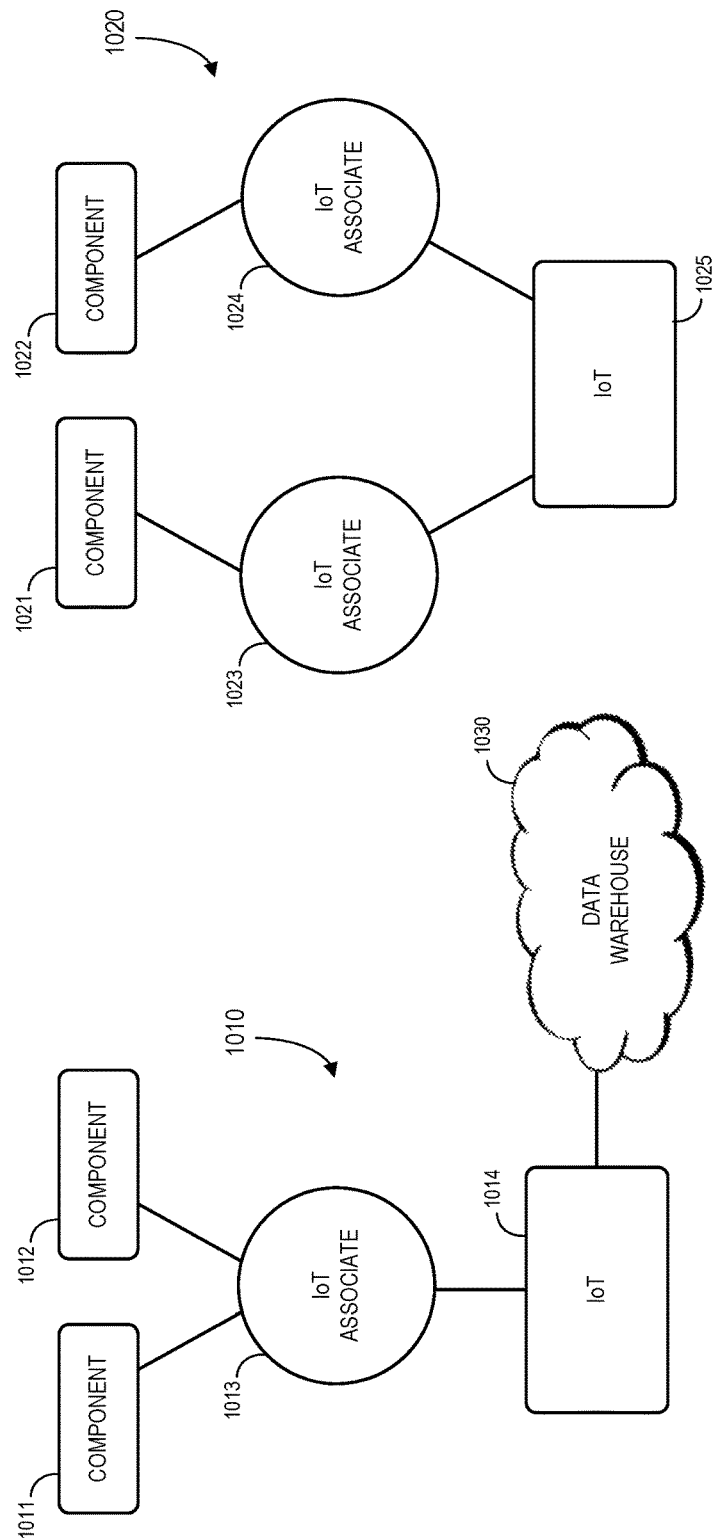
FIG. 10 illustrates different configurations for connecting components to computational associates.

Note that there may be different configurations possible to connect components, such as sensors, to each IoT associate 931, 932, 933, 934. FIG. 10 illustrates a configuration 1010 in which two components 1011, 1012 are both connected to an IoT associate 1013 which in turn is connected to the IoT 1014. This configuration 1010 might be used, for example, if the components 1011, 1012 are spatially proximate to each other on the physical system. In another configuration 1020, two components 1021, 1022 may each be connected to a different IoT associate 1023, 1024. Moreover, each of the IoT associates 1023, 1024 may be connected to the IoT 1025. This configuration 1020 might be appropriate, for example, if the components 1023, 1024 are significantly spatially distant from each other on the physical system.

In the example where the components 1011, 1012 the IoT associate 1013 are in spatial proximity, the communication links between the components 1011. 1012 and the IoT associate 1013 might comprise physical layer links (as opposed to virtual connections). The individual links may be, for example, wired or wireless links. The IoT associate 1013 may also be in communication with the IoT 1014 which may be capable of sending and receiving data from other subscribers to the IoT, such as a data warehouse 1030. This example might be representative of modeling appropriate for a twinned physical system with a limited spatial extent, such as a jet engine.

In other cases, components of twinned physical system might not be in spatial proximity and communication between them may take place through the IoT. For example, as illustrated in FIG. 10, two system components, 1021, 1022 are not in spatial proximity and each sends information to an IoT associate 1023, 1024. For example, one component 1021 may have a physical layer link with IoT associate 1023 while the other component 1022 is in communication with the IoT associate 1024 also through a physical layer link. The IoT associates 1023 and 1024 are spatially distant and communicate with each other as necessary through the IoT. This example might be representative of modeling a twinned physical system, such as a series of significantly physically separated compressor stations associated with a natural gas pipeline.

Note that an IoT associate may include a communication port that communicates with a plurality of components, including both sensors and actuators associated with the twinned physical system. Moreover, information may be exchanged with components via at least one of: (i) a wired connection, and (ii) an encrypted wireless connection. According to some embodiments, information is exchanged via the IoT with a private symmetric key system. According to some embodiments, information is exchanged with the data warehouse 1030 via a public asymmetric key cryptographic algorithm.

Further note that one operational requirement for a spatially distributed system may comprise an ability to execute a defined, sequenced process that is initiated by a significant decline in system health. The process may bring the system off-line in a scheduled, orderly, and cost-beneficial manner thereby reducing any unscheduled down time. This may require monitoring system components during their operation within a system. The monitored data may be used, in conjunction with system component models, to estimate the health of the individual system components and the system comprising the components is itself modeled using a digital twin comprising a code object that has its physical twin's dimensions and keeps the values of those dimensions current by receiving and updating values via the new outputs from the sensors in the components. The code object for a twin and the functional and historical data of its comprised components may be stored in the data warehouse 1030, such as one associated with a cloud application.

Another system need may comprise a requirement for the spatially distributed application of actuator controls. The controls may need to be of proper magnitudes and applied in a properly synchronized and staged manner. The controls may also be contained in code objects that are stored in the data warehouse 1030.

In order to connect, process, sequence, and otherwise link sensing and control activities within a spatially distributed system, modules termed "IoT associates" 1013, 1023, 1024 may be deployed to function as computer platforms for running the modeling and control code and as a communications interfaces and local routers for the modeling and control communications.

An IoT associate may comprise a module with structure for providing local data storage, performing computation, and also serving as a gateway to the IoT for communications relating to the individual components of the modeled and controlled system.

A system and its individual components may be modeled by digital objects referred to herein as "twins." The digital twin object codes are stored in the data warehouse 1030. The system and its individual components 1011, 1012, 1021, 1022 may also have historical data and manufacturing specifications that are likewise stored in the data warehouse 1030. Often, to be of use in near real-time or time-critical situations, the digital twin object codes of the system and its individual components 1011, 1012, 1021, 1022 and their historical data and manufacturing specifications, may be brought into spatial proximity in order to compute the system's health and expected remaining up-time. This local storage and local computational capability is performed in an IoT associate, which also serves as a gateway between a system's components and the IoT.

Figure 11:
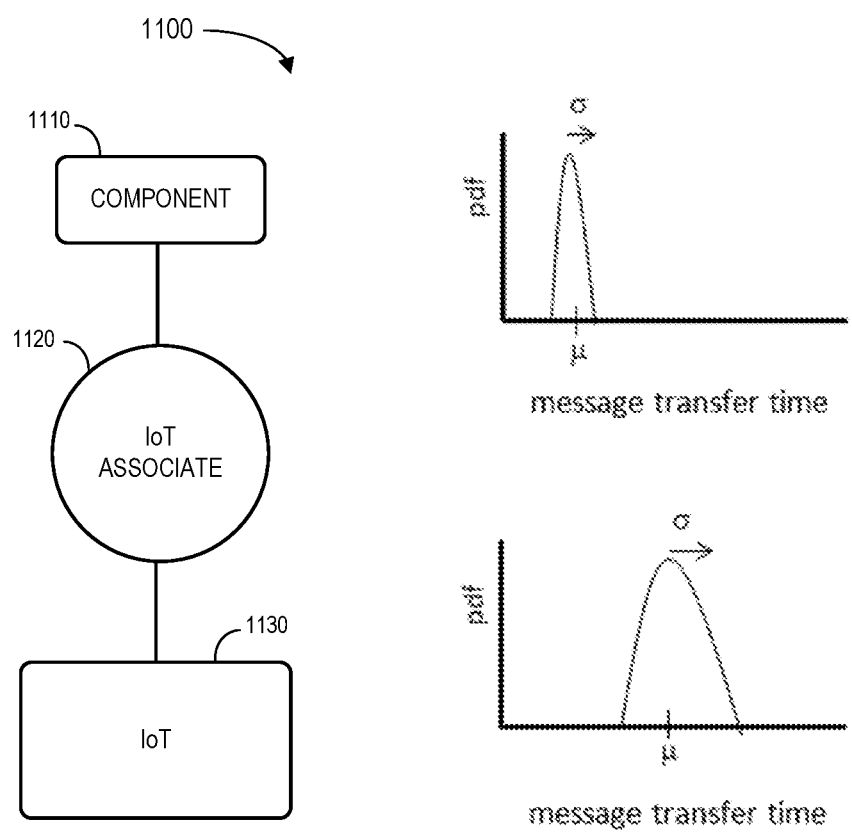
FIG. 11 illustrates communication latencies and moments according to some embodiments.

When running a model in an IoT associate that requires inputs from components that are not in sufficient spatial proximity, or when data or code is requested of, and transported from, a data warehouse, there will be longer communication latencies and increased variations in those latencies. This is illustrated in FIG. 11. A component 1110 is illustrated as communicating over a physical layer link to an IoT associate 1120. The message transfer times have a Probability Density Function ("PDF") with mean ("$\mu$") and standard deviation ("$\sigma$") as illustrated. When the IoT associate 1120 requests data or code through a remote entity connected to the IoT 1130, the communication latencies and their variations are expected to be larger than those experienced over the physical layer link between the component 1110 and the IoT associate 1120.

Providing appropriate communications security for the different communication paths may help preserve confidentiality of data and protect against adversarial measures, such as message alteration or message spoofing. By way of example, consider three different classes of communication, each requiring assessment for applying appropriate data security. In order of increased complexity, the three classes are:

(1) communications between a component to an IoT associate via a physical layer link, such as the communications link between component 1011 and IoT associate 1013 illustrated in FIG. 10;

(2) communications between a first IoT associate and a second IoT associate through the IoT, such as a communications path between IoT associate 1023 and IoT associate 1013 in FIG. 10; and (3) communications between an IoT associate and a data warehouse, such as illustrated by the communication path between IoT associate 1013 and the data warehouse 1030 as illustrated in FIG. 10.

For class (1) communications, encryption is probably not required if the communications link is a wired connection. If wireless, encryption may be needed if there is the potential of passive monitoring for an adversary's gain or the potential of active adversarial measures (such as message alteration or message spoofing). If encryption is needed, it may be straightforwardly provided by a private (symmetric) key system, such as the Advanced Encryption Standard ("AES") or an enterprise proprietary algorithm.

For class (2) communications, encryption may be needed because the data will pass outside of an enterprise perimeter as it is carried on the IoT. Encryption may be straightforwardly provided by a private (symmetric) key system such as the AES or an enterprise proprietary algorithm.

For class (3) communications, there may be a need to securely interface with an external entity, the data warehouse 1030, which most likely serves many different external customers. Communications between an IoT associate and the data warehouse 1030 will pass over the IoT and encryption is therefore desired. One suitable encryption scheme that may be straightforwardly implemented by both the IoT associate and the data warehouse may be built on a public (asymmetric) key cryptographic algorithm that develops its keys by use of a digital certificate scheme.

The structure of an IoT associate may include one or more wired circuit communication ports for receiving and transmitting messages containing data, such as system modeling code, addresses of IoT associates hosting components, recent values produced by components, requests for such data, the reporting of system modeling, and control commands. The structure may further include one or more wireless circuit communication ports for receiving and transmitting messages containing data, such as system modeling code, addresses of IoT associates hosting components, recent values produced by components, requests for such data, and the reporting of system modeling.

According to some embodiments, an IoT associate may incorporate a real-time clock, a computer for running system model code, processing and routing messages, and executing software cryptographic functions, electronic hardware for executing cryptographic functions, and a random (as opposed to a pseudorandom) number generator (e.g., for use in some cryptographic operations and/or when executing some system model code).

In some embodiments, an IoT associate includes memory for storing tables of data for communications management, system model code, and data respecting system componentry such as manufacturing specifications and individual component functional histories. Moreover, because an IoT associate may reside and function in a stressed environment, it may include a built-in electronics odometer to assess the health of the electronic componentry used within the IoT associate itself to accurately predict its remaining useful life. Electronics failure may result through many different mechanisms including bias temperature instability, hot carrier injection, time-dependent dielectric breakdown and electro-migration, especially as device layouts get smaller and the operational voltage margins diminish. A minimal amount of chip surface and power might be dedicated to hosting circuitries that assess the wear and tear of the foregoing and other failure-promoting mechanisms. The odometer might comprise an on-chip, in-situ monitor, with predictive algorithms incorporated for using the multi-dimensional data gathered by the monitoring circuitries.

An important consideration for sensing and controlling a spatially distributed system may be the reliability and availability of the of the communication transport service, such as the IoT. It may be important for all of the IoT associates to be aware of the condition of the IoT. If the IoT should completely or even partially fail or its message transport time grow beyond a prescribed limit, then the system may either (i) cease operation or (ii) enter an "operate into the future" mode for a prescribed period of time if its previously known state and mission as specified by its control code will safely allow this. Note that continuing to operate for a prudent period may provide a better result than ceasing operation if the communication transport service problem is only short-term temporary.

According to some embodiments, an IoT associate may be configured to receive via an IoT a test message from another IoT associate, the test message including a time value. The IoT associate may update the time value in the test message and forward the test message via the IoT. For example, the test message may comprise an electronic round robin test message received from a first IoT associate and the forwarding comprises forwarding the electronic round robin test message to a second IoT associate. Moreover, the message may further include: (i) data fields that report on sensor failures, and/or (ii) fields to forward commands that enable or activate virtual sensors. The IoT associate may determine that a test message has not been received or that the time value in the test message indicates that the IoT performance has degraded below a pre-determined threshold. Responsive to the determination, the IoT associate may perform at least one of: (i) an operation shutdown, or (ii) enter an "operate into the future" mode. According to some embodiments, the test message comprises a packet transported by a protocol that protects content against data corruption and requires re-transmission pending unacknowledged receipt.

By way of a non-limiting example of a method to determine the condition of the IoT is a repetitive round-robin or circuit technique. Consider, for example, a system including four IoT associates to the IoT. A message, "RR," may instituted and continually circulate through the four IoT associates proceeding, for example, as transmitted from the first IoT associate to the second IoT associate, then from the second IoT associate to the third IoT associate, etc. in a repeating cycle. The message RR may, for example, be a packet transported by a protocol that protects content against data corruption and requires retransmission pending unacknowledged receipt. The message RR may include data fields that record the most recent times that the message RR was transmitted by the IoT associates it visited in its circuit. The message RR may also comprise data fields that report on sensor failures and forward commands to enable or activate virtual sensors where and when necessary and viable. The most important information provided to the IoT associates by the message RR may be the condition of the IoT as inferable from the delays incurred in the stages of the round-robin circuit. If the delays exceed prescribed intervals, then the IoT associates might either cause the system to shut down or enter into an "operate into the future" mode until the IoT message transport times return to acceptable intervals (or until a prescribed interval is exceeded after which system shut down may be enacted). The decisions by the IoT associates may be based on the most recent state of the system and the system's mission code.

Figure 12:
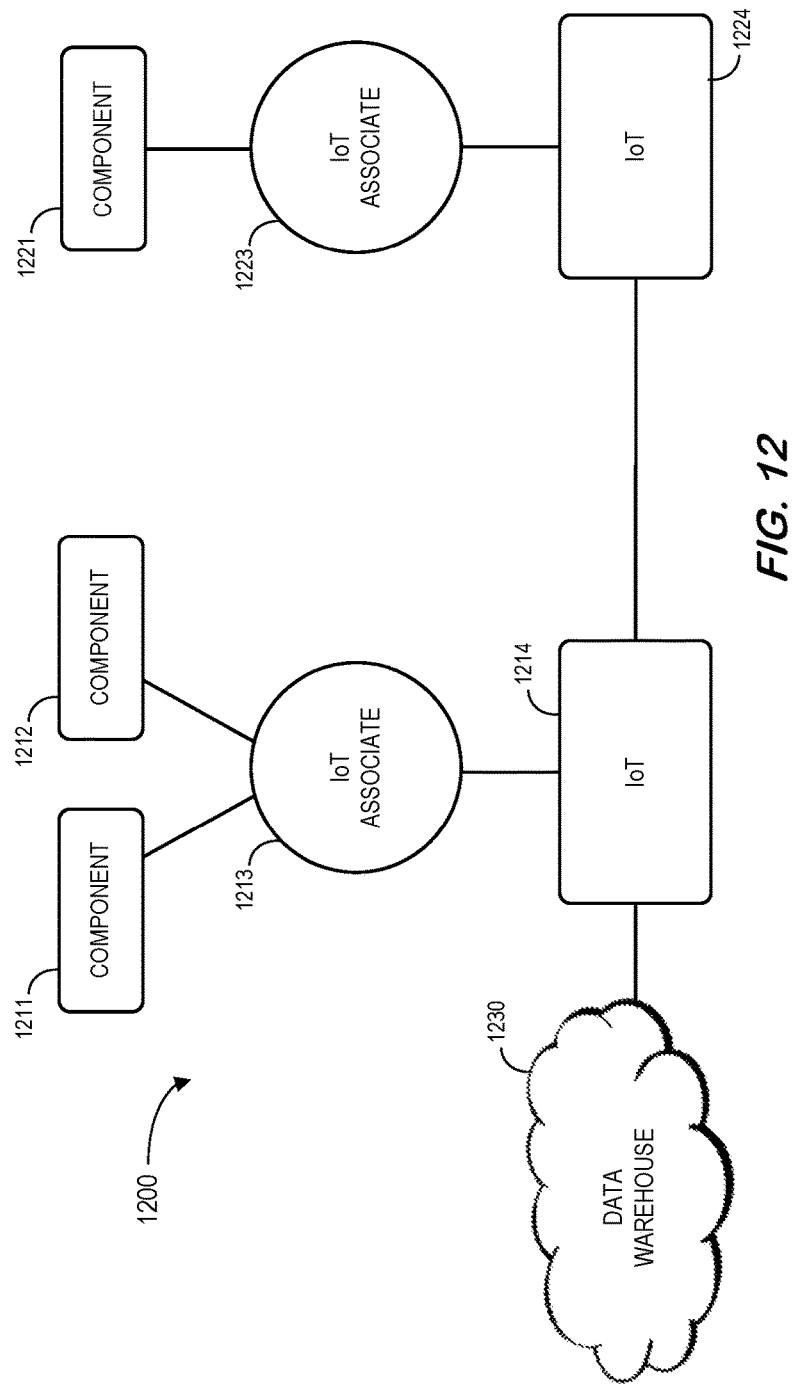
FIG. 12 illustrates an example layout of entities involved in physical system modeling.

FIG. 12 illustrates a non-limiting example 1200 layout of entities involved in physical system modeling. In this example 1200, an IoT associate 1213 receives data from components 1211, 1212 and is designated to model physical system #N. The instruction to model may initiate the following successive modes and their actions: an activation mode; an instruction mode, a data connection mode, and a process mode.

In the activation mode, IoT associate 1213 may create its physical layer link connection table populated by the IPv6 addresses of those components to which IoT associate 1213 is connected by a physical layer link and the nature of the physical layer link (i.e., wired or wireless). In the example of Table I, the component number is provided in parenthesis after the component's IPv6 address for the reader's ease in following FIG. 12. Additionally, the IPv6 addresses may be shortened. Long strings of zeros, for example, may be compressed or suppressed by convention.

TABLE I

Component's IPv6 Address and Type of Connection to Hosting IoT associate

| Component's IPv6 Address | Type of Physical Link Layer Connection |
| --- | --- |
| xx . . . x (element 1211) | wired |
| xx . . . x (element 1212) | wireless |
| xx . . . x (element 1213) | wired |

In the instruction mode, after IoT associate 1213 is tasked with modeling physical system #N: (1) IoT associate 1213 may request and receive model code for physical system #N from the data warehouse 1230; and (2) IoT associate 1213 may be provided with the IPv6 addresses to be used for the component variables in the model code for physical system #N.

In the data connection mode, IoT associate 1213 may launch discovery messages into the IoT 1214 to find those IoT associates that have physical layer links to the components to which IoT associate 1213 does not have physical layer link connections. For this example, IoT associate 1223 may report having a physical layer link to component 1221. IoT associate 1213 may be guided by instructions in the model code for physical system #N and request that IoT associate 1223 forward to IoT associate 1213 time-stamped values from component 1221 at a specified rate. If component 1221 is a sensor, for example, the specified rate may be governed by the Nyquist criterion. Optionally, IoT associate 1213 may measure $\sigma$ and $\mu$ of the latencies in delivery to IoT associate 1213 of the time-stamped values forwarded by IoT associate 1223. In the process mode, IoT associate 1213 may then proceed to model physical system #N.

Figure 13:
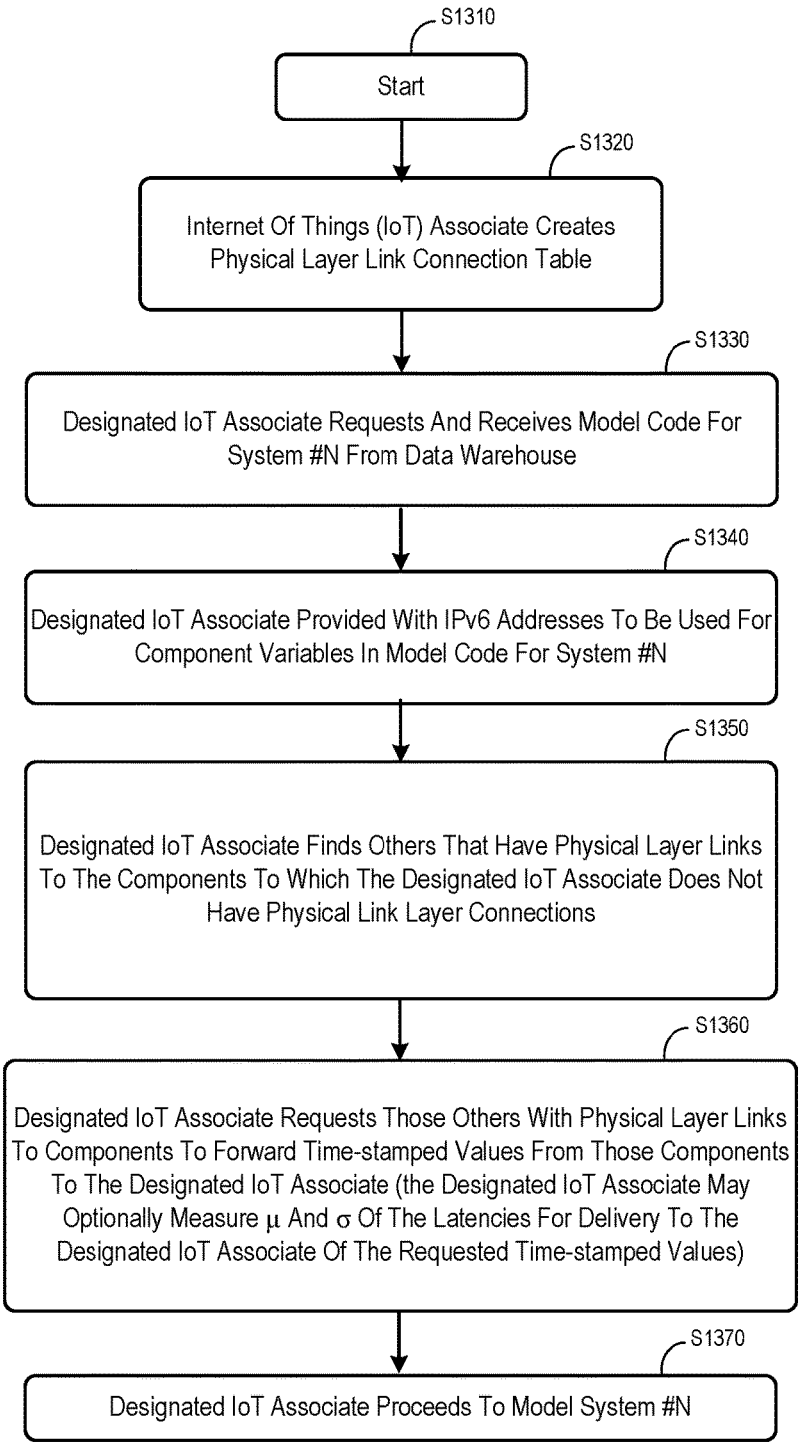
FIG. 13 illustrates a flow chart of steps associated with the FIG. 12 layout.

A flow chart of the sequencing of steps in the preceding example of the designated IoT associate modeling is illustrated in FIG. 13. In particular, the modeling flow may be initiated at S1310. At S1320, the IoT associate may create a physical layer link connection table. At S1330, the designated IoT associate may request and receive the model code for system #N from the data warehouse. At S1340, the designated IoT associate may be provided with the IPv6 addresses to be used for the component variables in the model code for system #N (e.g., an industrial asset). At S1350, the designated IoT associate finds those IoT associate's that have physical layer links to the components to which the designated IoT associate does not have physical link layer connections. At S1360, the designated IoT associate requests those IoT associates having physical layer links to components which the designated IoT associate does not have physical link layer connections, to forward time-stamped values from those components to the designated IoT associate. The designated IoT associate may optionally measure $\mu$ and $\sigma$ of the latencies for delivery to the designated IoT associate of the requested time-stamped values. At S1370, the designated IoT associate may proceed to model system #N.

Figure 14:
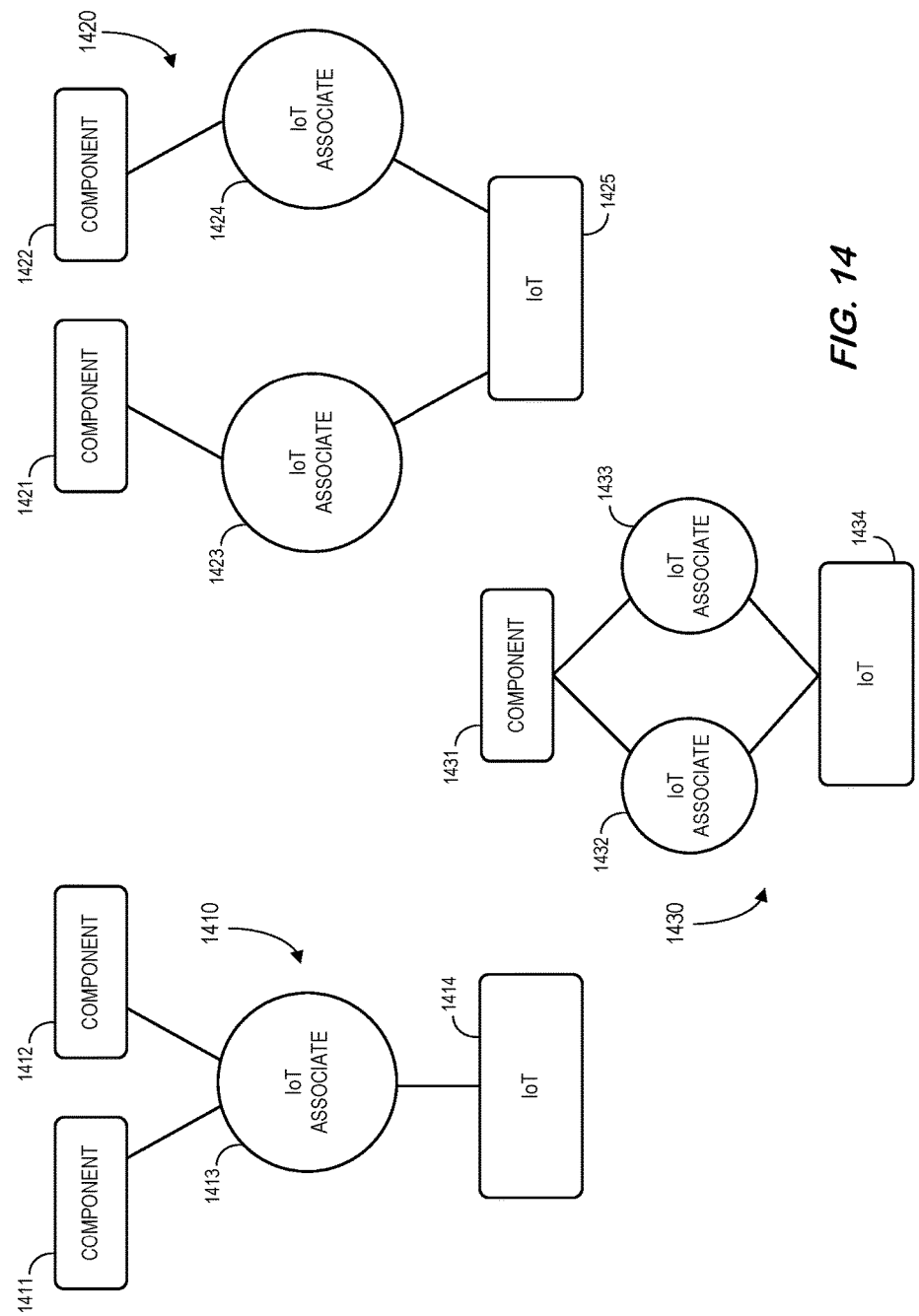
FIG. 14 illustrates some different configurations for connecting components to the computational associates.

Note that many different configurations may be used to connect components to an IoT associate. For example, FIG. 14 illustrates some of these configurations. In one configuration 1410, two components 1411, 1412 are both connected to a single IoT associate 1413 which in turn is connected to an IoT 1414. This configuration 1410 might be used if the components 1411, 1412 are spatially proximate on the physical system. In another configuration 1420, two components 1421, 1422, are each connected to a different IoT associate 1423, 1424. Each IoT associate 1423, 1424 is connected to a single IoT 1425. This configuration 1420 might be appropriate, for example, if the components 1423, 1424 are significantly spatially distant from each other on the physical system. In still another configuration 1430, a single component 1431 is connected to two IoT associates 1432, 1433, each of which are connected to a single IoT 1434. This configuration 1430 might be used, for example, when the component 1431 provides data that is promptly needed by computations taking place in both of the IoT associates 1432, 1433. This configuration 1430 might also be appropriate when component 1431 is substantially important to digital twin calculations and, by virtue of the redundancy imparted by the configuration 1430, a data path to 1431 will still exist upon failure of either of the two IoT associates 1432, 1433.

Having a set of IoT associates connected via an IoT may allow for distributed computation and benefit from the computational gain provided by having more than a single computational platform present in an IoT associate. Note that communication between two IoT associates through the IoT may be subject to varying latency and might be of lower bandwidth than communications provided by a physical layer link between two IoT associates. This characteristic of the communications supporting the digital twin computations may result in a departure from a classical view of parallel computation as summarized in Table II. Moreover, this characteristic may be recognized and accounted for when performing digital twin computations which are distributed and not strictly parallel.

TABLE II

Significant Differences: Parallel Computation and Distributed Computation

| Parallel Computation | Distributed Computation |
| --- | --- |
| Processors located in a spatial cluster | Processors dispersed |
| Processor inter-communications low latency | Processor communications higher latency |
| Processor inter-communications stable latency | Processor inter-communications variable latency |
| Processor inter-communications high bandwidth | Processor inter-communications lower bandwidth |

Note that computation times needed to solve exact equations may exceed the time required for a result in order to monitor, protect, and/or effectively prognosticate concerning a twinned physical system. For this reason, it may be desirable to use computational approximations by employing such techniques as linearization, reduced order modeling, fuzzy logic, and/or neural networks.

In the case of linearization, many different scales may be applied to approximate physics-based models for small departures from previously studied conditions. Moreover, it might be used in a much broader application scale of modeling—such as, for example, in decomposing Kalman filter operations into piecewise linear segments for faster-than-real-time processing of sensed engine measurements.

In the case of Reduced Order Modeling ("ROM"), software for evaluating damage and predicting RUL or the time to failure of a twinned physical system may be formed by appropriate extractions from full digital twin code. These extractions may in turn be reduced in complexity by approximations. An additional approach in using a ROM digital twin is to use a discrete event simulation approach and essentially adjust the granularity of the time increments used in running the models. A corporate memory of modeling, such as might be stored in a data warehouse, may retain significant time stretches of the identical modeled system's behavior with conditions close to a present model's conditions. In this case, extrapolation approximations over significantly long time periods may be used instead of re-doing nearly identical computations. Alternatively, cached scenario results from prior runs may be called rather than re-calculated.

For example, ground-based gas turbines may benefit from ROM because combustion systems exhibit significant dynamics pertaining to unsteady pressure with oscillations fed by heat release which are, in turn, products of gas flow and chemistry. Such systems may require constant tuning. Moreover, tuning for high dynamic incidents cannot be done manually, and that is why computerized models may be used to perform the tuning in a timely manner. Note that active control modifying combustion system dynamics has in many cases been successfully accomplished using reduced order models that are executable relatively quickly.

Models may not be completely physics based, but instead represent reduced or surrogate models which are trained by simulating "what-if" scenarios with a design of experiments. Multiple surrogate models in combination with physics based models may be orchestrated for scenario analysis and/or decision support. In instances where the computation time exceeds the requisite decision time constant, lesser fidelity or surrogate models may be selectively called to reduce the calculation sequence duration.

In some cases, ROM techniques may be required to estimate a RUL for an onboard platform if the RUL model is beyond the capabilities of the onboard computational hardware. The ROM of a Digital Twin ("ROMDT") may an approximation of the ideal digital twin and the approximations may represent the physical models, their integration, and/or the complete state spaces of the components. Declarative programming may be used to implement a ROMDT following the paradigm of instructing the computer as to what is desired without specifically dictating the control flow for accomplishing the computations, such as the decision paths, within the ROMDT.

In the case of fuzzy logic, a ROM digital twin may be formed, according to some embodiments, using an analysis of material fatigue, and may substantially simplify computational complexity and/or provide for faster execution time. Even though uncertainty may exist in present models, fatigue problems may be especially well suited for the use of fuzzy logic.

In general, the adaptability of an adaptable digital twin may happen along multiple dimensions, which, for example, could include adapting a performance or life kernel from one twinned physical system class in a given family to another sister twinned physical system. This could be for, example, from one jet engine component in an engine line to the same component in another engine line or adapting a twinned physical system model developed for a specific operating environment to a different operating environment.

There are several methods for transporting performance and associated life kernels from one domain to another for model adaptation. One such example method is called transfer learning associated with: 1) what to transfer, 2) how to transfer, and 3) when to transfer. The "what to transfer" decision may depend to which part of knowledge can be transferred across domains or tasks. For example, some knowledge may be specific for individual domains or tasks, while other knowledge may be common between different domains such that they may help improve performance for the target domain or task. After discovering which knowledge can be transferred, learning algorithms may facilitate a transfer of the knowledge ("how to transfer"). The "when to transfer" decision may be based on the particular situations during which transferring operations should be performed.

Transfer learning may contain many specific examples and methodologies that can be applied to the digital twin in its role as an adaptive digital twin. At a general level, transfer learning techniques try to determine an optimal function to translate a given predictive function, T (in our case the model kernel, $\bar{y}=f(\bar{a}, \bar{x})$), built for the domain $\Psi_a$ with its specific feature set to another domain $\Psi_b$ with its own and different feature set. In our example, the domains {Ψ$_j$} could represent two gas turbine engine lines or two different environmental conditions.

An "interacting digital twin" might be scalable over an asset class or between classes. One benefit provided by interacting digital twins may be that each of the plurality of the digital twins is updateable by useful results originating in any one of the plurality of the interacting digital twins. A single digital twin may also be construed as an interacting digital twin when it is used as an interactive adjunct equipment in a design process.

A plurality of digital twins is updateable by useful results originating in any one of the plurality of the interacting digital twins. The digital twins may be equipped with data lines that communicate with other digital twins so that results obtained through the running of the plurality of digital twins over an asset class may be used to refine the digital twins' life estimation algorithms and then develop more appropriate limits on exceedance envelopes over the magnitudes of the residuals. For example, one digital twin in communication with a plurality of other digital twins within a specified environment might communicate optimal or recommended conditions. The digital twins receiving this information may then evaluate the effectiveness of the received settings based upon their own tuned model or models.

Figure 15:
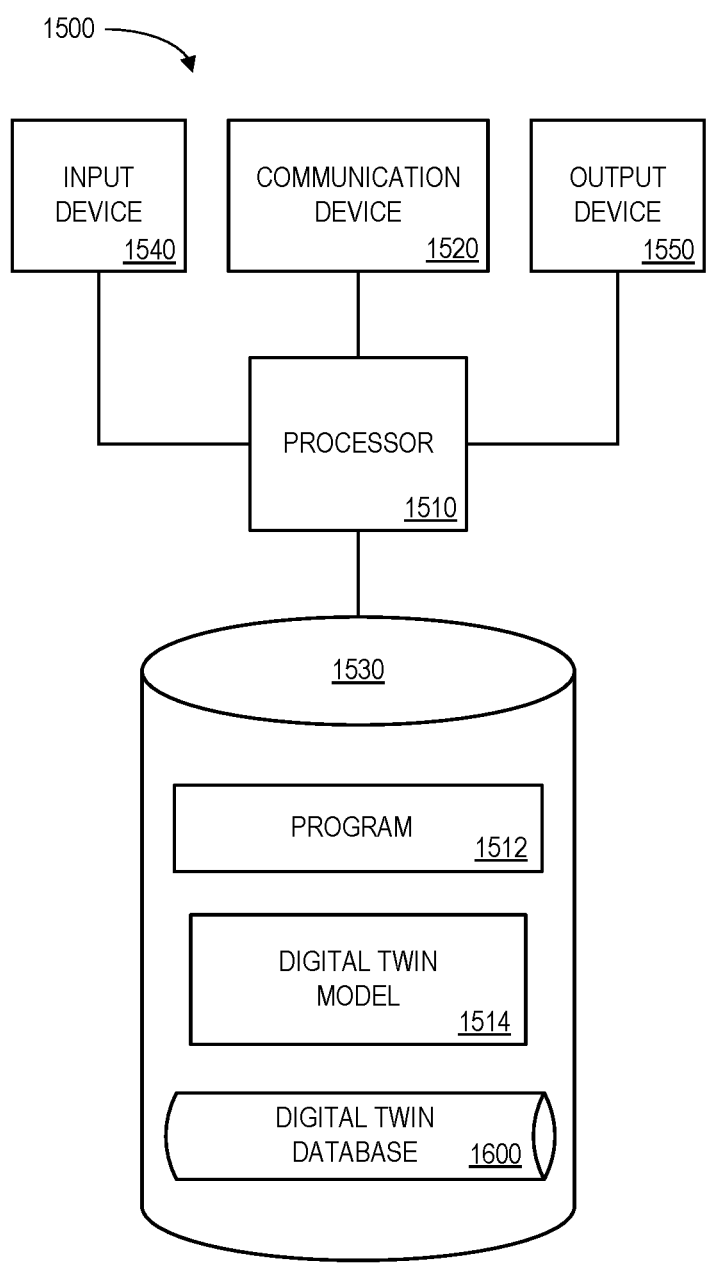
FIG. 15 is block diagram of a digital twin platform according to some embodiments of the present invention.

The embodiments described herein may be implemented using any number of different hardware configurations. For example, FIG. 15 is a block diagram of a digital twin platform 1500 that may be, for example, associated with the system 100 of FIG. 1 (e.g., and might, for example, represent an IoT associate). The digital twin platform 1500 comprises a processor 1510, such as one or more commercially available Central Processing Units ("CPUs") in the form of one-chip microprocessors, coupled to a communication device 1520 configured to communicate via a communication network (not shown in FIG. 15). The communication device 1520 may be used to communicate, for example, with one or more remote user platforms, digital twins, computations associates, etc. The digital twin platform 1500 further includes an input device 1540 (e.g., a computer mouse and/or keyboard to input adaptive and/or predictive modeling information) and/an output device 1550 (e.g., a computer monitor to render display, transmit recommendations, and/or create reports). According to some embodiments, a mobile device and/or personal computer may be used to exchange information with the digital twin platform 1500.

The processor 1510 also communicates with a storage device 1530. The storage device 1530 may comprise any appropriate information storage device, including combinations of magnetic storage devices (e.g., a hard disk drive), optical storage devices, and/or semiconductor memory devices. The storage device 1530 stores a program 1512 and/or a digital twin model 1514 for controlling the processor 1510. The processor 1510 performs instructions of the programs 1512, 1514, and thereby operates in accordance with any of the embodiments described herein. For example, the processor 1510 may receive information that has been sensed, by one or more sensors, of one or more designated parameters of a twinned physical system. The processor 1510 may also receive, via the IoT, the digital twin model 1514 from a data warehouse. The processor 1510 may then, for at least a selected portion of the twinned physical system, execute the digital twin model 1514 in connection with the one or more sensors and operation of the twinned physical system. According to some embodiments, the processor 1510 also transmits information associated with a result generated by execution of the model 1514.

The programs 1512, 1514 may be stored in a compressed, uncompiled and/or encrypted format. The programs 1512, 1514 may furthermore include other program elements, such as an operating system, clipboard application, a database management system, and/or device drivers used by the processor 1510 to interface with peripheral devices.

As used herein, information may be "received" by or "transmitted" to, for example: (i) the digital twin platform 1500 from another device; or (ii) a software application or module within the digital twin platform 1500 from another software application, module, or any other source.

In some embodiments (such as the one shown in FIG. 15), the storage device 1530 further stores a digital twin database 1600. An example of a database that may be used in connection with the digital twin platform 1500 will now be described in detail with respect to FIG. 16. Note that the database described herein is only one example, and additional and/or different information may be stored therein. Moreover, various databases might be split or combined in accordance with any of the embodiments described herein.

Figure 16:
FIG. 16 is a tabular portion of a digital twin database according to some embodiments.

Referring to FIG. 16, a table is shown that represents the digital twin database 1600 that may be stored at the digital twin platform 1500 according to some embodiments. The table may include, for example, entries identifying sensor measurement associated with a digital twin of a twinned physical system. The table may also define fields 1602, 1604, 1606, 1608 for each of the entries. The fields 1602, 1604, 1606, 1608 may, according to some embodiments, specify: a digital twin identifier 1602, engine data 1604, engine operational status 1606, and vibration data 1608. The digital twin database 1600 may be created and updated, for example, when a digital twin is created, sensors report values, operating conditions change, etc.

The digital twin identifier 1602 may be, for example, a unique alphanumeric code identifying a digital twin of a twinned physical system. The engine data 1604 might identify a twinned physical engine identifier, a type of engine, an engine model, etc. The engine operational status 1606 might indicate, for example, that the twinned physical engine state is "on" (operation) or "off" (not operational). The vibration data 1608 might indicate data that is collected by sensors and that is processed by the digital twin. Note that vibration data 1608 might be collected and processed even when the twinned physical system is "off" (as reflected by the third entry in the database 1600).

Figure 17:
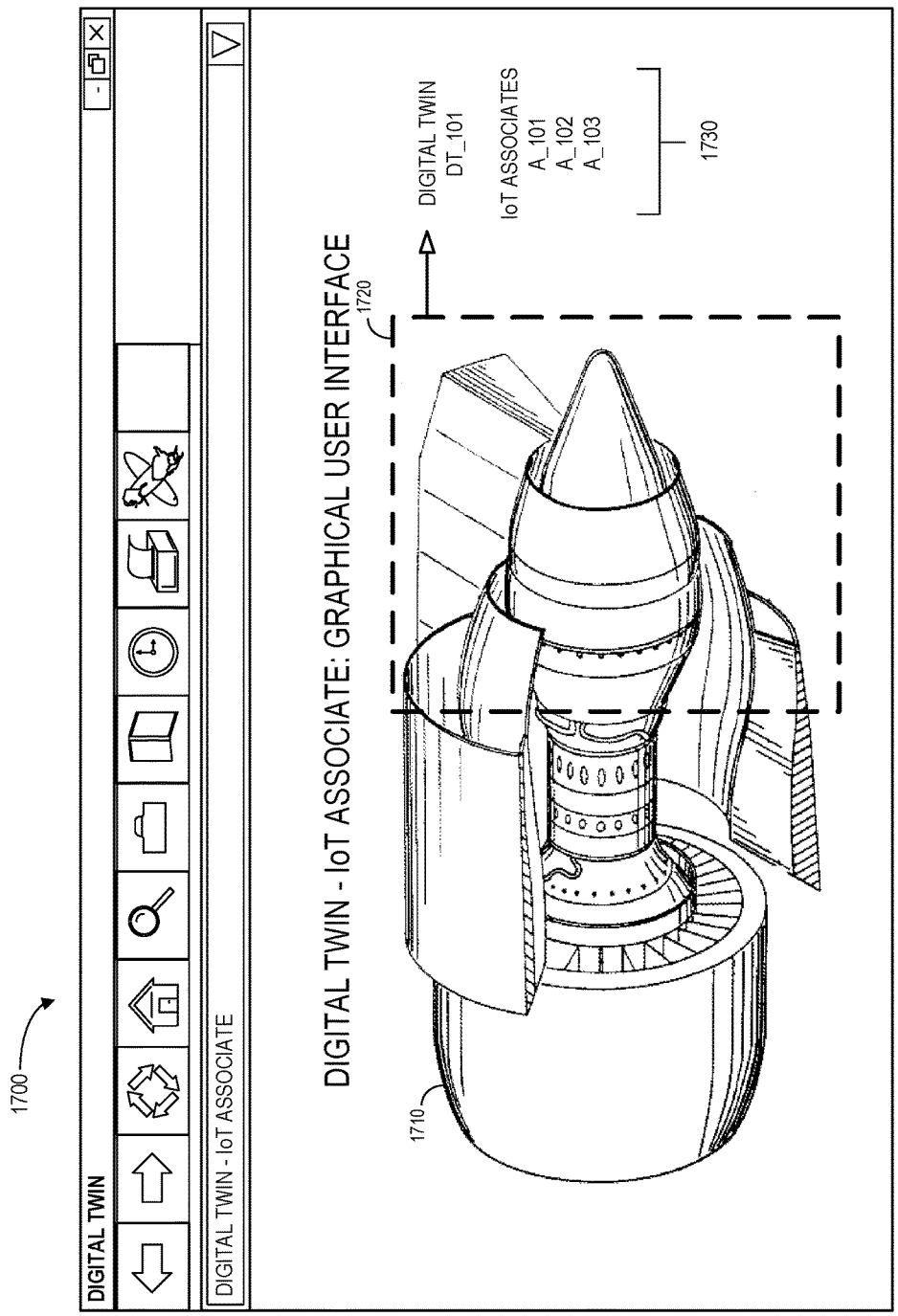
FIG. 17 illustrates an interactive graphical user interface display according to some embodiments.

FIG. 17 illustrates an interactive graphical user interface display 1700 according to some embodiments. The display 1700 may include a graphical rendering 1710 of a twinned physical object and a user selectable area 1720 that may be used to identify portions of a digital twin associated with that physical object. A data readout area 1730 might provide further details about the select portions of the digital twins (e.g., IoT associates within those portions, sensors, data values, etc.).

Thus, some embodiments may provide systems and methods to facilitate assessments and/or predictions for a physical system in an automatic and accurate manner.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on industrial assets, any of the embodiments described herein could be applied to other types of systems.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A communication network associate that exchanges information via a spatially distributed communication network to facilitate implementation of a digital twin of a twinned physical system, comprising:
    a communication port to communicate with at least one component, the at least one component comprising a sensor or an actuator associated with the twinned physical system;
    a gateway to exchange information via the communication network;
    a computer processor and local data storage, coupled to the communication port and gateway, to receive a digital twin model from a data warehouse via the IoT and programmed to:
        for at least a selected portion of the twinned physical system, execute the digital twin model in connection with the at least one component and operation of the twinned physical system;
    a real-time clock;
    a module to process at least one of: (i) messages containing data, (ii) system modeling code, (iii) addresses of communication network associates hosting components, (iv) recent values produced by components, (v) requests for data, (vi) reporting of system modeling, and (vii) control commands;
    dedicated hardware to execute cryptographic functions;
    a random number generator for use in cryptographic operations or executing model code;
    a storage element storing tables of data for communications management, system model code, and data respecting system componentry including manufacturing specification and individual component functional histories; and
    an electronics odometer to assess electronic componentry health within the communication network associate itself and generate a value predicting remaining useful life.

2. The communication network associate of claim 1, wherein the computer processor is further configured to:
    receive via the communication network a test message from another communication network associate, the test message including a time value,
    update the time value in the test message, and
    forward the test message via the communication network.

3. The communication network associate of claim 2, wherein the test message comprises an electronic round robin test message received from a first communication network associate and the forwarding comprises forwarding the electronic round robin test message to a second communication network associate.

4. The communication network associate of claim 2, wherein the test message further includes at least one of: (i) data fields that report on sensor failures, and (ii) fields to forward commands that enable or activate virtual sensors.

5. The communication network associate of claim 2, wherein the computer processor is further configured to:
    determine that the time value in the test message indicates that the communication network performance has degraded below a pre-determined threshold.

6. The communication network associate of claim 5, wherein the computer processor is further configured to:
    responsive to the determination, perform at least one of:
        (i) an operation shutdown, or (ii) continue to operate for a prescribed period of time.

7. The communication network associate of claim 2, wherein the test message comprises a packet transported by a protocol that protects content against data corruption and requires re-transmission pending unacknowledged receipt.

8. The communication network associate of claim 1, wherein the communication port communicates with a plurality of components, including both sensors and actuators associated with the twinned physical system.

9. The communication network associate of claim 8, wherein the gateway is further used to communicate with other communication network associates.

10. The communication network associate of claim 9, wherein the computer processor is further to:
    create a physical layer link connection table, and
    request and receive model code for the twinned physical system.

11. The communication network associate of claim 10, wherein the computer processor is further to:
    receive addresses for the plurality of components, and
    determine a set of components whose addresses that require communication via a set of other communication network associates.

12. The communication network associate of claim 11, wherein the computer processor is further to:
    ask the set of other communication network associates to forward a time-stamped value from each component in the set of components, and
    model the twinned physical system.

13. The communication network associate of claim 1, wherein information is exchanged with the at least one component via at least one of: (i) a wired connection, and (ii) an encrypted wireless connection.

14. The communication network associate of claim 13, wherein information is exchanged via the IoT with a private symmetric key system.

15. The communication network associate of claim 14, wherein information is exchanged with the data warehouse via a public asymmetric key cryptographic algorithm.

16. The communication network associate of claim 1, wherein the digital twin is: adaptable to a new scenario or a new system configuration and is transferable to another system or class of systems, and scalable over an asset class or between asset classes and is updatable by another digital twin, and
    further wherein the digital twin is associated with a computational approximation technique comprising at least one of: linearization, a reduced order model, fuzzy logic, and a neural network.

17. A computerized method for a communication network associate that exchanges information via a spatially distributed communication network to facilitate implementation of a digital twin of a twinned physical system, comprising:
  sensing, by one or more sensors, one or more designated parameters of the twinned physical system;
  receiving at the communication network associate, via the communication network, a digital twin model from a data warehouse;
  for at least a selected portion of the twinned physical system, executing by a computer processor of the communication network associate the digital twin model in connection with the one or more sensors and operation of the twinned physical system;
  transmitting information associated with a result generated by the computer processor;
  processing at least one of: (i) messages containing data, (ii) system modeling code, (iii) addresses of communication network associates hosting components, (iv) recent values produced by components, (v) requests for data, (vi) reporting of system modeling, and (vii) control commands;
  storing tables of data for communications management, system model code, and data respecting system componentry including manufacturing specification and individual component functional histories; and
  assessing, by an electronics odometer, electronic componentry health within the communication network associate itself using predictive algorithms to generate a value predicting remaining useful life.

18. The method of claim 17, further comprising:
  receiving via the communication network a test message from another communication network associate, the test message including a time value,
  updating the time value in the test message, and
  forwarding the test message via the communication network, wherein said receiving, updating, and forwarding are performed on a periodic basis.

19. A non-transitory, computer-readable medium storing instructions that, when executed by a computer processor, cause the computer processor to perform a method for a communication network associate that exchanges information via a spatially distributed communication network to facilitate implementation of a digital twin of a twinned physical system, the method comprising:
  sensing, by one or more sensors, one or more designated parameters of the twinned physical system;
  receiving, at the communication network associate via the communication network, a digital twin model from a data warehouse;
  for at least a selected portion of the twinned physical system, executing by a computer processor of the IoT associate the digital twin model in connection with the one or more sensors and operation of the twinned physical system;
  transmitting information associated with a result generated by the computer processor;
  processing at least one of: (i) messages containing data, (ii) system modeling code, (iii) addresses of communication network associates hosting components, (iv) recent values produced by components, (v) requests for data, (vi) reporting of system modeling, and (vii) control commands;
  storing tables of data for communications management, system model code, and data respecting system componentry including manufacturing specification and individual component functional histories; and
  assessing, by an electronics odometer, electronic componentry health within the communication network associate itself using predictive algorithms to generate a value predicting remaining useful life.

20. The medium of claim 19, where the digital twin further comprises a graphical interface engine that enables an operator to:
  indicate the selected portion of the twinned physical system; and
  display a rendering of the selected portion of the twinned physical system, wherein the rendering indicates the one or more designated parameters in substantially real time.

\* \* \* \* \*